United States Patent
Liu et al.

(10) Patent No.: US 12,160,165 B2
(45) Date of Patent: Dec. 3, 2024

(54) POWER CONVERSION SYSTEM AND COMMUNICATION METHOD THEREOF

(71) Applicant: Delta Electronics (Shanghai) Co., Ltd., Shanghai (CN)

(72) Inventors: Hong Liu, Shanghai (CN); Wen Zhang, Shanghai (CN); Yuxin Han, Shanghai (CN); Cheng Lu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 58 days.

(21) Appl. No.: 18/325,137

(22) Filed: May 30, 2023

(65) Prior Publication Data

US 2024/0030802 A1    Jan. 25, 2024

(30) Foreign Application Priority Data

Jul. 22, 2022   (CN) .......................... 202210871900.8

(51) Int. Cl.
    *H02J 13/00*       (2006.01)
    *H02J 3/01*        (2006.01)
    (Continued)

(52) U.S. Cl.
    CPC .............. *H02M 1/0067* (2021.05); *H02J 3/01* (2013.01); *H02J 13/00007* (2020.01);
    (Continued)

(58) Field of Classification Search
    CPC ............. H02M 1/0003; H02M 1/0016; H02M 1/0019; H02M 1/0025; H02M 1/0067;
    (Continued)

(56) References Cited

U.S. PATENT DOCUMENTS

2018/0309379 A1* 10/2018 Basic ...................... H02M 1/15
2022/0407407 A1* 12/2022 Huang .................... H02M 1/12
2024/0235206 A1*  7/2024 Preindl .................. H02M 7/81

FOREIGN PATENT DOCUMENTS

CN         108574424 A     9/2018
CN         112087158 B    10/2021
(Continued)

OTHER PUBLICATIONS

Juan C. Vasquez; Josep M. Guerrero; Mehdi Savaghebi; Joaquin Eloy-Garcia; Remus Teodorescu; "Modeling, Analysis, and Design of Stationary-Reference-Frame Droop-Controlled Parallel Three-Phase Voltage Source Inverters"; Apr. 16, 2012; IEEE; IEEE Transactions on Industrial Electronics; pp. 1271-1280 (Year: 2012).*

(Continued)

*Primary Examiner* — Thienvu V Tran
*Assistant Examiner* — Shahzeb K Ahmad
(74) *Attorney, Agent, or Firm* — CKC & Partners Co., LLC

(57) ABSTRACT

The present disclosure discloses a power conversion system and a communication method for transmitting common mode information in the power conversion system. The communication method comprises the following steps: (a) providing at least two power conversion cells; (b) generating, by each of the power conversion cells, an AC harmonic according to a first electrical signal at the first terminal of the power conversion cell, wherein an amplitude of each AC harmonic represents first information of the power conversion cell, and all the AC harmonics are at the same frequency; and (c) injecting the AC harmonic generated by the corresponding power conversion cells into the first terminal of the corresponding power conversion cell and applying a closed-loop suppression to the AC harmonic generated by the corresponding power conversion cell, and controlling the (Continued)

resonance control unit to output a second electrical signal related to the first information.

24 Claims, 22 Drawing Sheets

(51) Int. Cl.
*H02M 1/00* (2007.01)
*H02M 1/12* (2006.01)
*H02M 7/04* (2006.01)
*H02M 7/217* (2006.01)
*H02M 7/49* (2007.01)
*H02M 7/493* (2007.01)

(52) U.S. Cl.
CPC ....... *H02M 1/0016* (2021.05); *H02M 1/0074* (2021.05); *H02M 1/123* (2021.05); *H02M 7/04* (2013.01); *H02M 7/217* (2013.01); *H02M 7/49* (2013.01); *H02M 7/493* (2013.01)

(58) Field of Classification Search
CPC ...... H02M 1/0074; H02M 1/12; H02M 1/123; H02M 1/126; H02M 7/02; H02M 7/04; H02M 7/043; H02M 7/155; H02M 7/21; H02M 7/217; H02M 7/49; H02M 7/493; H02J 13/00032; H02J 13/00007; H02J 13/00006; H02J 3/01; H02J 3/26; H02J 2203/20

See application file for complete search history.

(56) References Cited

FOREIGN PATENT DOCUMENTS

WO  WO-2013174420 A1 * 11/2013  ............ H02M 7/483
WO  WO-2016082878 A1 *  6/2016  ................ H02J 3/01

OTHER PUBLICATIONS

John Blessy et al., "Improved control strategy for accurate load power sharing in an autonomous microgrid", IET Generation, Transmission&Distribution, IET, UK, vol. 11, No. 17, Nov. 30, 2017 (Nov. 30, 2017), pp. 4384-4390.

Juan C Vasquez et al., "Modeling, analysis, and design of stationary reference frame droop controlled parallel three—phase voltage source inverters", Power Electronics and ECCE Asia (ICPE &ECCE), 2011 IEEE 8th International Conference on Power Electronics, IEEE, May 30, 2011 (May 30, 2011), pp. 272-279.

* cited by examiner

200

(a) Providing at least two power conversion cells, first terminals of the at least two power conversion cells being electrically coupled, and each of the power conversion cells including a resonance control unit;

(b) Generating, by each of the power conversion cells, an AC harmonic according to a first electrical signal at the first terminal of the corresponding power conversion cell, wherein an amplitude of each AC harmonic represents first information of the power conversion cell generating the AC harmonic correspondingly, and all the AC harmonics are at the same frequency;

(c) Injecting the AC harmonic generated by the corresponding power conversion cell into the first terminal of the corresponding power conversion cells, and applying, by the resonance control unit in the corresponding power conversion cell, a closed-loop suppression to the AC harmonic generated by the corresponding power conversion cell correspondingly, and controlling the resonance control unit to output a second electrical signal related to the first information, wherein the second electrical signal includes the common mode information of the power conversion cell, or is used to generate the common mode information of the power conversion cell with the injected AC harmonic.

FIG. 2

The larger the gain of the resonance controller, the faster the response

The larger the bandwidth of the resonance controller, the faster the response

R₃: The resonance controller outputs the positive sequence or negative sequence component of the three-phase third harmonic

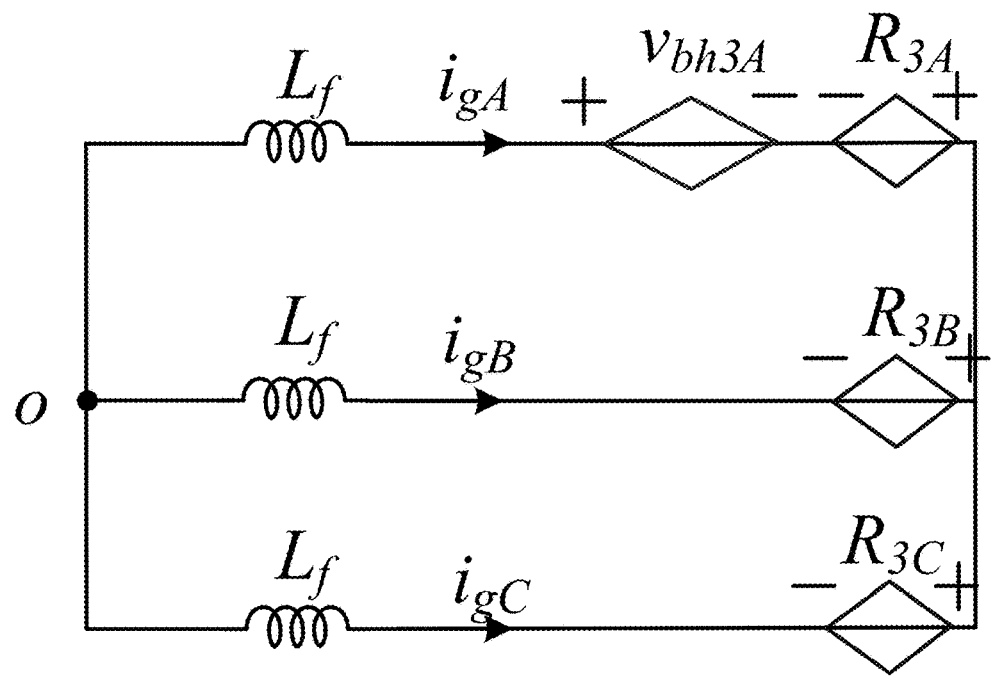
Third harmonic equivalent circuit
Superposition theorem
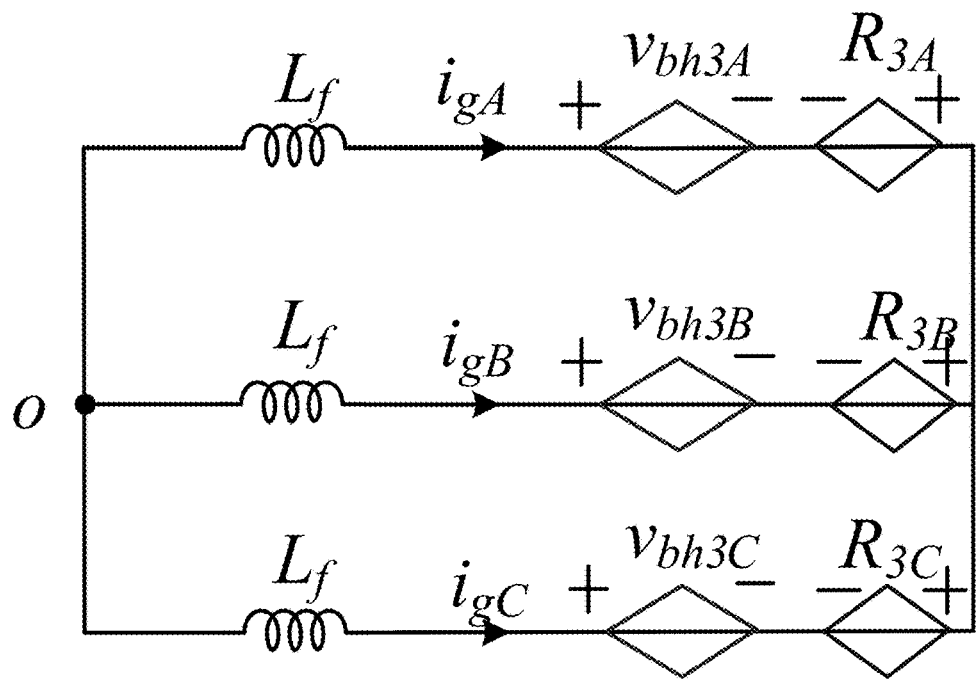
FIG. 14

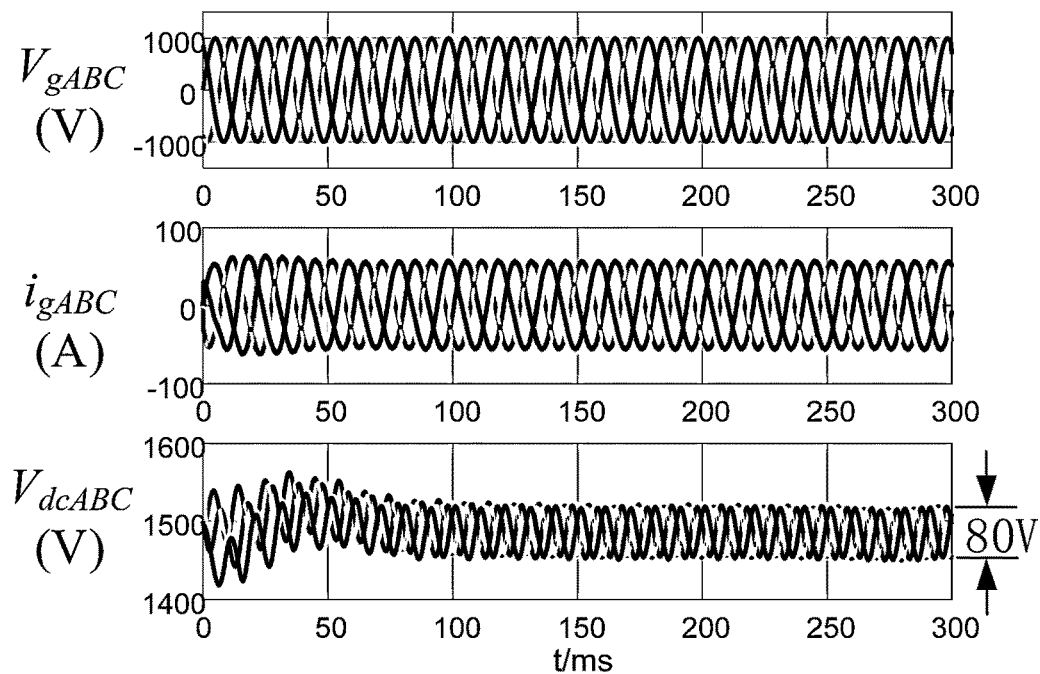
(A) Zero-sequence component is not injected
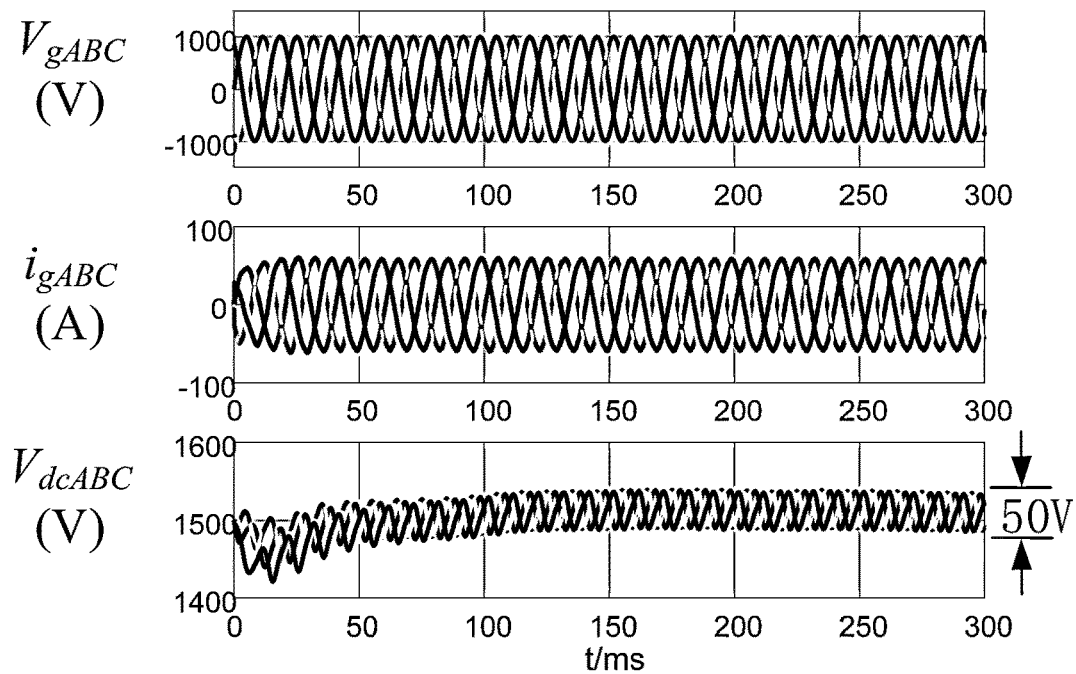
(B) Zero-sequence component is injected according to the present invention
FIG. 17

POWER CONVERSION SYSTEM AND COMMUNICATION METHOD THEREOF

CROSS REFERENCE TO RELATED APPLICATION

This application claims the benefit of priority to Chinese Application No. 202210871900.8, filed on Jul. 22, 2022, the content of which is incorporated herein by reference in its entirety.

BACKGROUND OF THE DISCLOSURE

1. Field of the Disclosure

The present disclosure relates to a power conversion technology, and in particular to a power conversion system and a communication method thereof.

2. Related Art

Power electronic modules may be connected in series-parallel to implement applications with a high voltage or a large current, so as to achieve purposes such as expanding capacity or improving reliability in redundant power supply. Such a series-parallel system is widespread. For example, in a power electronic transformer system as shown in FIG. 1A, each phase includes a plurality of modules M1 which are cascaded at a AC side for receiving a medium voltage, and connected in parallel at a DC side, such that DC outputs of three phases may be connected in parallel to provide an appropriate DC voltage to a load. Each of the plurality of modules M1 includes, for example, an AC-DC sub-module at a pre-stage and a DC-DC sub-module at a post-stage. The system may convert AC power at the medium voltage to DC power at a low voltage, exhibiting extensive application prospects in a data center, a charging station, new energy power generation and other fields in the future.

In such a modular system, a distributed control method is generally adopted, i.e., installing a controller on each module, so that the combined system has good flexibility, scalability and reliability. However, in order to control each module independently, some issues need to be considered, such as voltage sharing, current sharing or power sharing. A conventional solution is to apply a droop control. In order to compensate for static error caused by the droop control, it is necessary to transmit a mean value of the voltage, the current, or the power. However, conventional transmission methods rely too much on communication lines, such that additional communication load will reduce the reliability and modularity of the system, resulting in difficulties in installation and debugging. With an increase in the number of the modules, communication speed will decrease, which will affect dynamic performance of the system. Therefore, it is of great significance to implement information transmission between modules without relying on communication lines.

In addition, for a three-phase Y-connected system, if a control which is fully independent for three phases is applied, advantages of three-phase c combination could not be fully exploited. For example, the three-phase Y-connected system as shown in FIG. 1B includes a plurality of modules M2. In the three-phase Y-connected system, a zero-sequence voltage component is injected into an AC bridge arm voltage, which may improve utilization of the DC voltage and reduce a fluctuation in double frequency of DC-Link. Conventional injection of the zero-sequence voltage is implemented based on a centralized controller, and the zero-sequence voltage is calculated on the basis that the voltages in three phases (such as $v_{gA}$, $v_{gB}$, $v_{gC}$) and the current in three phases (such as $i_{gA}$, $i_{gB}$, $i_{gC}$) are known at the same time. The conventional injection of the zero-sequence voltage depends on the communication among the three phases, which requires communication loops to be installed between controllers in the three phases, making it more complicated to debug and maintain the three-phase system. There is no relevant technology about how to inject the zero-sequence voltage into the three-phase system in a distributed manner.

Therefore, it becomes one urgent demand in the industry to implement the transmission of common mode information in the modular system without relying on the communication lines.

SUMMARY OF THE DISCLOSURE

The present disclosure aims to provide a power conversion system and a communication method thereof, which can effectively solve at least one defect of the prior art, and transmit common mode information without relying on a communication line.

To achieve the above purpose, the present disclosure provides a communication method for transmitting common mode information in a power conversion system. The communication method includes: (a) providing at least two power conversion cells, first terminals of the at least two power conversion cells being electrically coupled, and each of the power conversion cells including a resonance control unit; (b) generating, by each of the power conversion cells, an AC harmonic according to a first electrical signal at the first terminal of the corresponding power conversion cell, wherein an amplitude of each AC harmonic represents first information of the power conversion cell generating the AC harmonic correspondingly, and all the AC harmonics are at the same frequency; and (c) injecting the AC harmonic generated by the corresponding power conversion cell into the first terminal of the corresponding power conversion cell, and applying, by the resonance control unit in the corresponding power conversion cell, a closed-loop suppression to the AC harmonic generated by the power conversion cell correspondingly, and controlling the resonance control unit to output a second electrical signal related to the first information, wherein the second electrical signal includes the common mode information of the power conversion cell, or is used to generate the common mode information of the power conversion cell with the injected AC harmonic.

In order to achieve the above purpose, the present disclosure further provides a power conversion system, including: at least two power conversion cells, first terminals of the at least two power conversion cells being electrically coupled, and each of the power conversion cells including a controller, and each controller including a resonance control unit, wherein the controller in each of the power conversion cells is configured to: generate an AC harmonic according to a first electrical signal at the first terminal of the corresponding power conversion cell, wherein an amplitude of the AC harmonic represents first information of the power conversion cell generating the AC harmonic correspondingly, and all the AC harmonics are at the same frequency; and inject the AC harmonic generated by the corresponding power conversion cell into the first terminal of the corresponding power conversion cell, and apply, by the resonance control unit in the corresponding power conversion cell, a closed-loop suppression to the AC harmonic generated by the power conversion cell correspondingly, and control the resonance control unit to output a second electrical signal related to the first information, wherein the second electrical signal includes the common mode information of the power conversion cell, or is used to generate the common mode information of the power conversion cell with the injected AC harmonic.

The present disclosure may present the following technical advantages:

(1) The common mode information may be transmitted without relying on additional communication lines;
(2) The AC harmonic at the connection port of the power conversion cell may be suppressed, which substantially does not cause the harmonic pollution to the system and improves the voltage quality; and
(3) The AC harmonics at the same frequency are injected into respective power conversion cell, which occupies a narrower frequency band and may be controlled easily.

Additional aspects and advantages of the present disclosure will be set forth in part in the following description, and will become apparent in part from the description, or may be learned through the practice of the present disclosure.

BRIEF DESCRIPTION OF THE DRAWINGS

The above and other features and advantages of the present disclosure will become more apparent by describing the exemplary embodiments for the same in detail with reference to the drawings.

FIG. 2 is a flowchart of a communication method in a power conversion system according to the present disclosure;

FIG. 14 shows a principle of the zero-sequence component injection in the three-phase Y-connected system according to the present disclosure;

Figure 18:
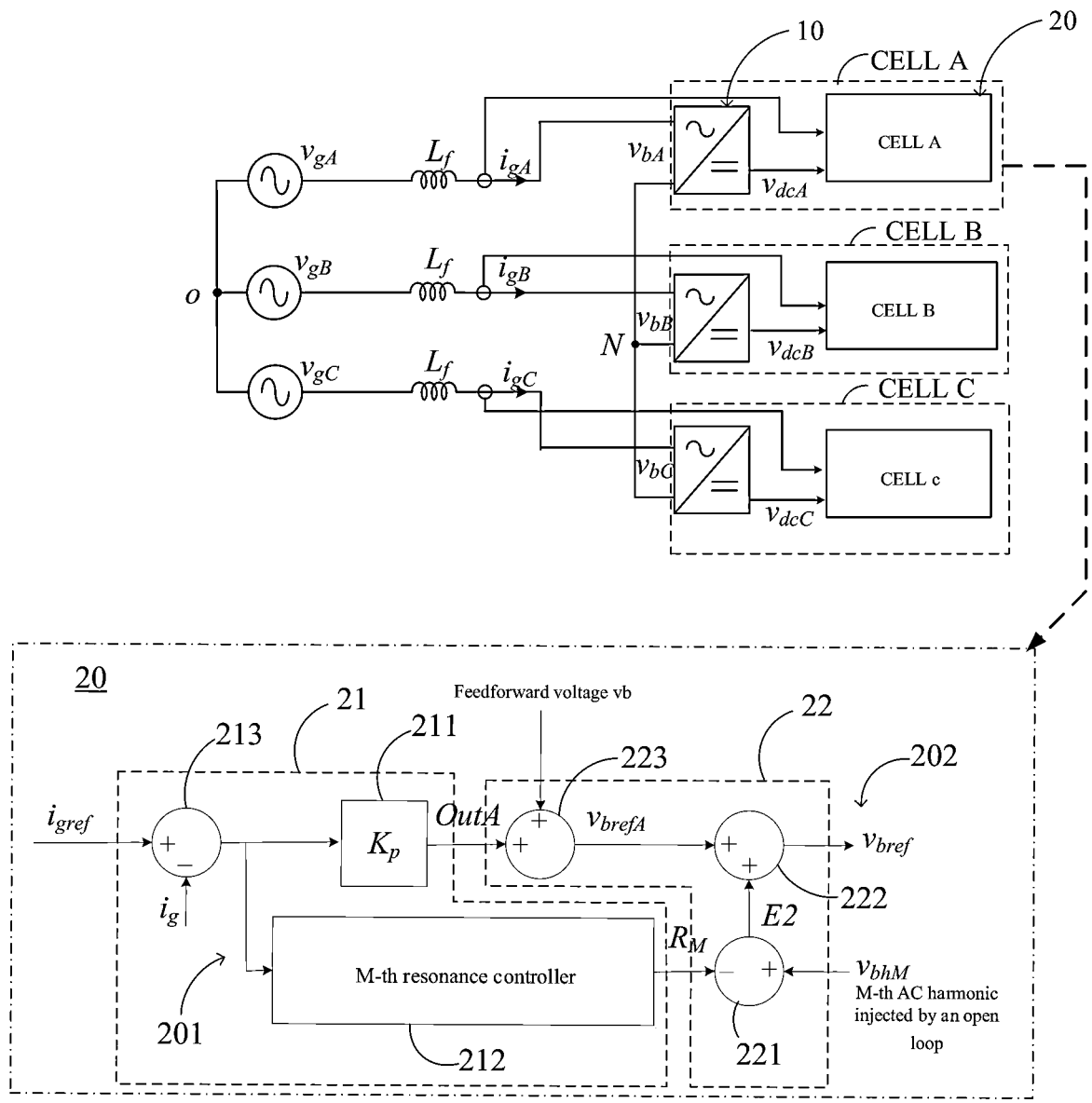
Figure 19:
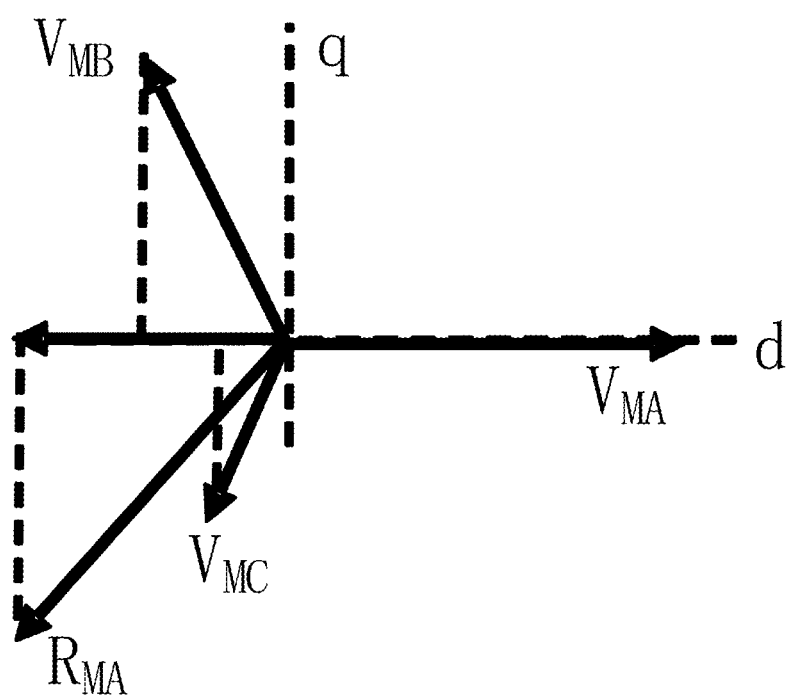
Figure 20:
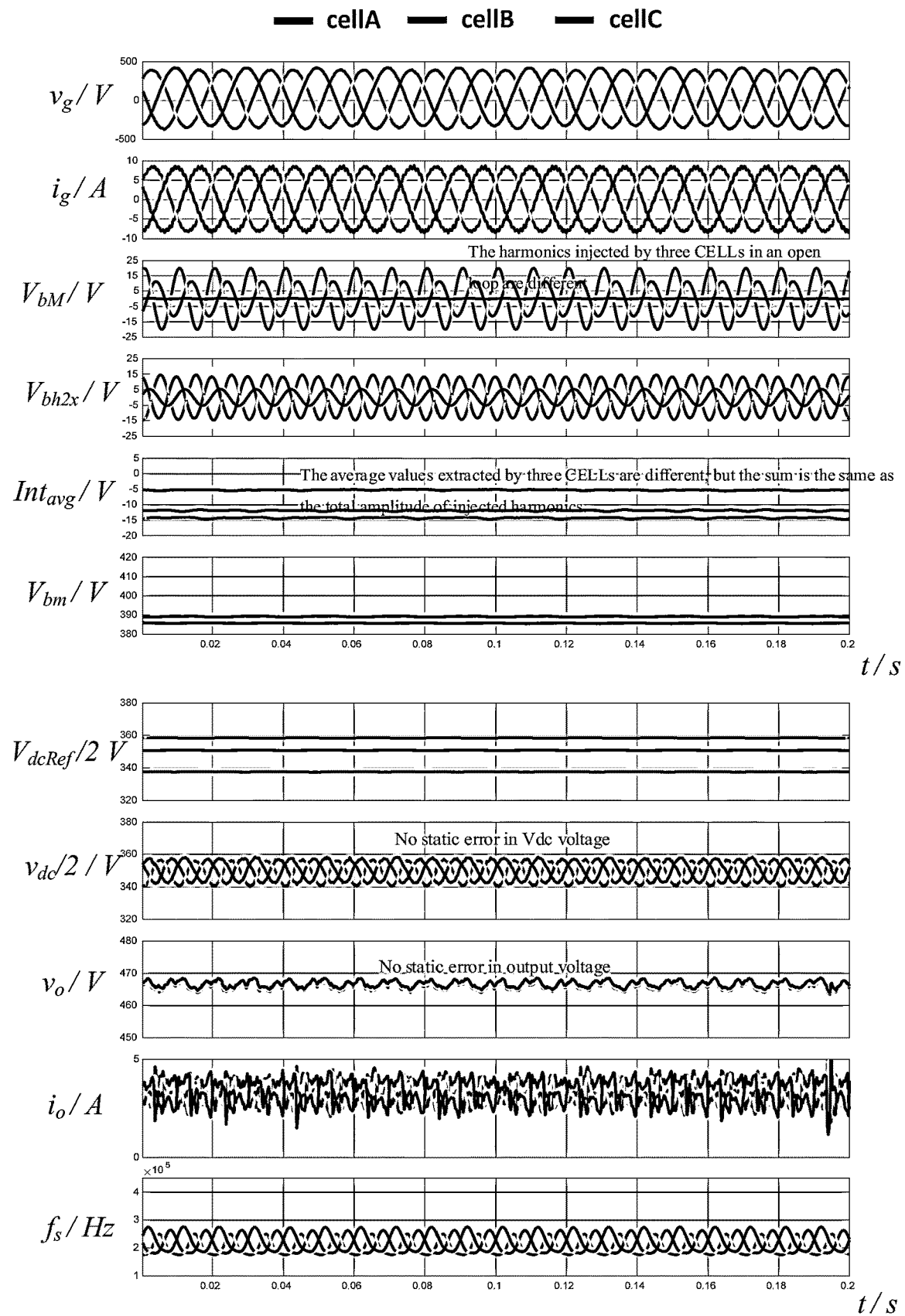

Part (A) and part (B) of FIG. 17 respectively show suppression effects for a double frequency of a voltage DC-Link in a case in which the zero-sequence component is not injected and in a case in which the zero-sequence component is injected according to the present disclosure;

FIG. 18 shows a circuit when the power conversion system according to the third embodiment of the present disclosure is a three-phase Y-connected system, and a method for obtaining the mean value in the system;

FIG. 19 shows a principle of the method for obtaining the mean value of all the first information in the three-phase Y-connected system according to the present disclosure; and FIG. 20 shows an experimental waveform according to the third embodiment of the present disclosure.

DETAILED EMBODIMENTS OF THE DISCLOSURE

Exemplary embodiments will now be described more fully with reference to the accompanying drawing. However, the exemplary embodiments may be implemented in many forms and should not be construed as limited to the embodiments set forth herein. On the contrary, these exemplary embodiments are provided so that the present disclosure will be comprehensive and complete, and will the conception of exemplary embodiments will be fully conveyed to those skilled in the art. The same reference numerals in the drawings denote the same or similar structures, and thus detailed descriptions thereof will be omitted.

When introducing the elements/components/etc. described and/or illustrated herein, the terms "one", "a", "this", "the" and "at least one" are used to indicate the existence of one or more elements/components/etc. The terms "include", "comprise" and "have" are used to mean open inclusion and mean that there may be other elements/components/etc. in addition to the listed elements/components/etc. In addition, the terms "first", "second" and the like in the claims are only used as marks, and are not numerical restrictions on their objects.

As shown in FIG. 2, the present disclosure provides a communication method 200 for transmitting common mode information in a power conversion system. The communication method 200 mainly includes the following steps:

(a) providing at least two power conversion cells, first terminals of the at least two power conversion cells being electrically coupled, and each of the power conversion cells including a resonance control unit;

(b) generating, by each of the power conversion cells, an AC harmonic according to a first electrical signal at the first terminal of the corresponding power conversion cell, wherein an amplitude of each AC harmonic represents first information of the power conversion cell generating the AC harmonic correspondingly, and all the AC harmonics are at the same frequency; and (c) injecting the AC harmonic generated by the corresponding power conversion cell into the first terminal of the corresponding power conversion cells, and applying, by the resonance control unit in the corresponding power conversion cell, a closed-loop suppression to the AC harmonic generated by the corresponding power conversion cell correspondingly, and controlling the resonance control unit to output a second electrical signal related to the first information, wherein the second electrical signal includes the common mode information of the power conversion cell, or is used to generate the common mode information of the power conversion cell with the injected AC harmonic.

Figure 3:
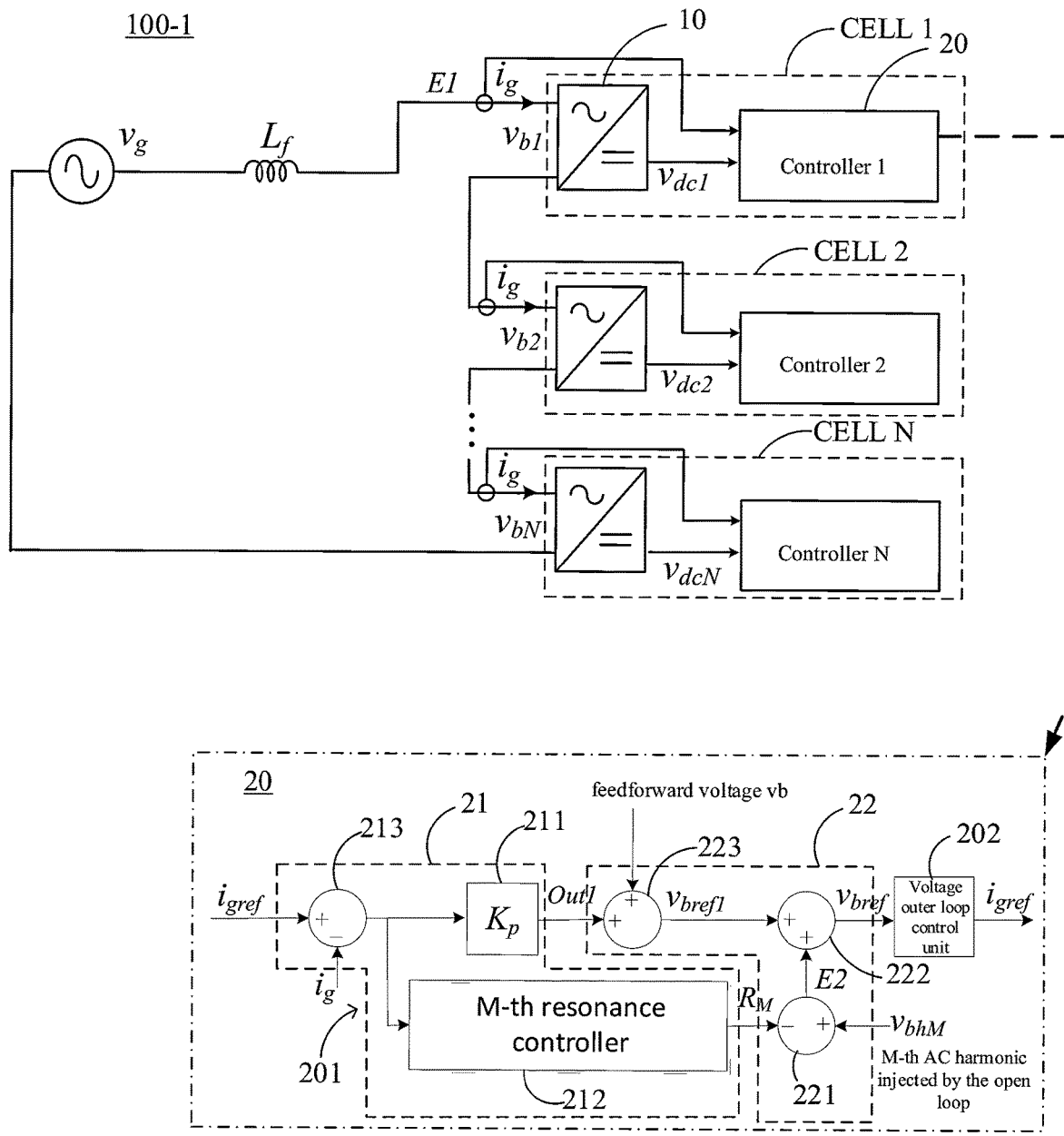
FIG. 3 shows a circuit of the power conversion system in the first embodiment of the present disclosure which is a single-phase series system, and a method for obtaining a mean value of all first information, wherein the mean value is common mode information.
Figure 12:
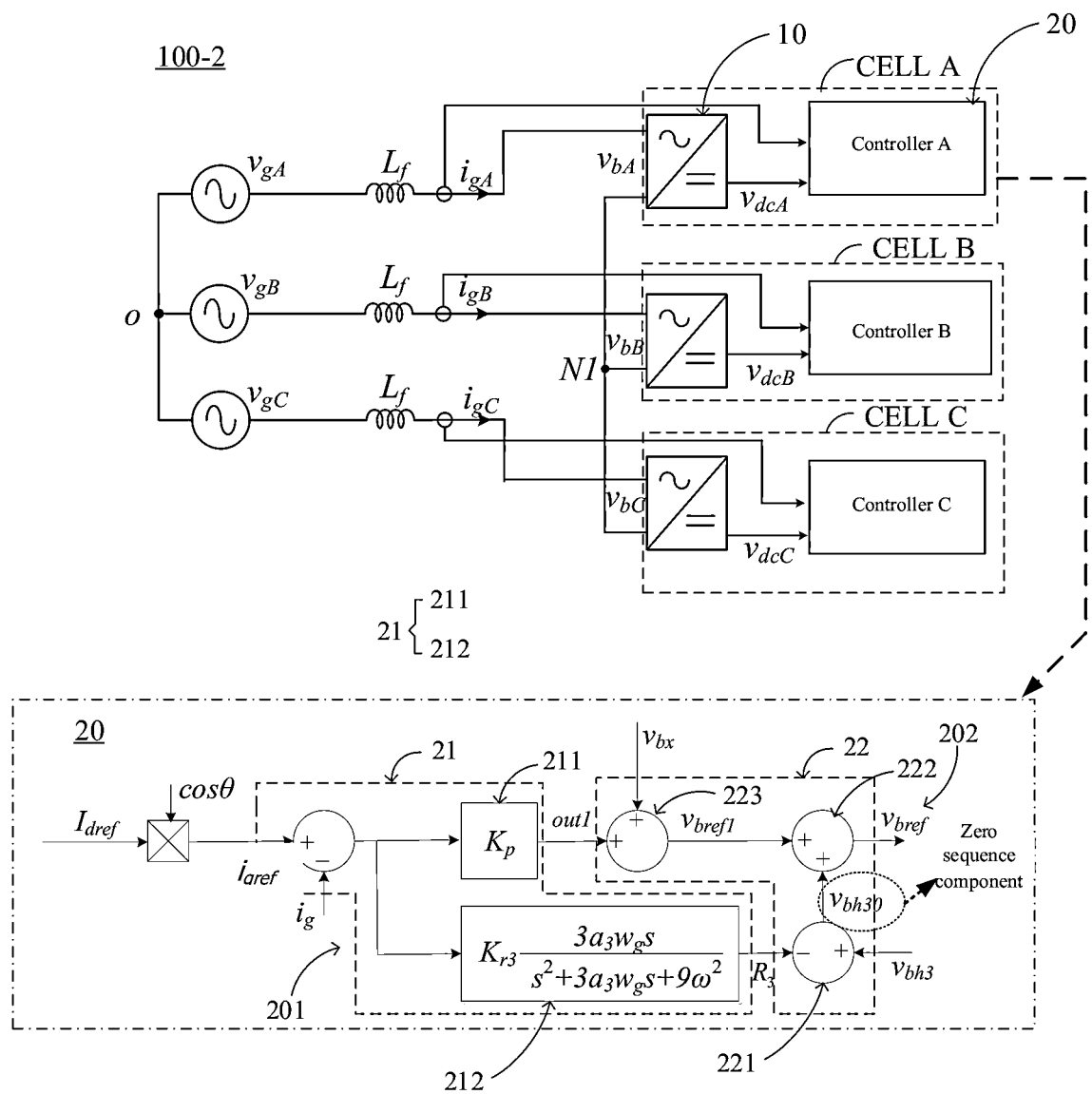
FIG. 12 shows a circuit when the power conversion system according to the second embodiment of the present disclosure is a three-phase system, and a zero-sequence component injection method without communication, in which the zero-sequence component is used as common mode information.

The present disclosure further provides a power conversion system 100-1, which includes at least two power conversion cells. For example, in the embodiment as shown in FIG. 3, the power conversion system 100-1 includes N power conversion cells CELL1, CELL2, . . . , and CELLN. Further, for example, in the embodiment as shown in FIG. 12, the power conversion system 100-2 includes 3 power conversion cells CELL1, CELL2, CELLS are included. The first terminals of the power conversion cells CELL1, CELL2, . . . , and CELLN are electrically coupled. Each of the power conversion cells (CELL1/CELL2/ . . . /CELLN) includes a power conversion module 10 and a controller 20 that are electrically coupled. For example, as shown in FIG. 3, the power conversion cells CELL1, CELL2, . . . , and CELLN includes a controller 1, a controller 2, . . . , and a controller N, respectively. In particular, according to the present disclosure, each controller 20 may include a resonance control unit 21. The controller 20 in each of the power conversion cells may be configured to:

(S1) generate an AC harmonic (for example, the harmonic $v_{bhM}$ in FIG. 3) according to the first electrical signal E1 at the first terminal of the power conversion cell (CELL1/CELL2/ . . . /CELLN), wherein an amplitude of each AC harmonic may represent the first information of the power conversion cell generating the AC harmonic, and all the AC harmonics are at the same frequency;

(S2) inject the AC harmonic generated by each of the power conversion cells (CELL1/CELL2/ . . . /CELLN) into the first terminal of the corresponding power conversion cell, and apply, by the resonance control unit 21 in the power conversion cell (CELL1/CELL2/ . . . /CELLN), closed-loop suppression on the AC harmonic generated by the corresponding power conversion cell, and control the resonance control unit 21 to output a second electrical signal related to the first information, wherein the second electrical signal (for example, $R_M$ in FIG. 3 or $R_3$ in FIG. 12) may include the common mode information of the power conversion cell or may be used to generate the common mode information of the power conversion cell with the injected AC harmonic.

Preferably, the step (b) of generating, by each of the power conversion cells, the AC harmonic according to the first electrical signal at the first terminal of the power conversion cell may further include, for example, steps of: (b1) performing a phase-locking operation on the first electrical signal E1 at the first terminal of the power conversion cell, and performing a frequency-doubling operation on the result of the phase-locking operation to generate a phase of the AC harmonic; and (b2) setting K times of the first information of the power conversion cell as the amplitude of the AC harmonic, where K is a positive number, for example, any positive number such as 1, 1.5, or 3.

Figure 6:
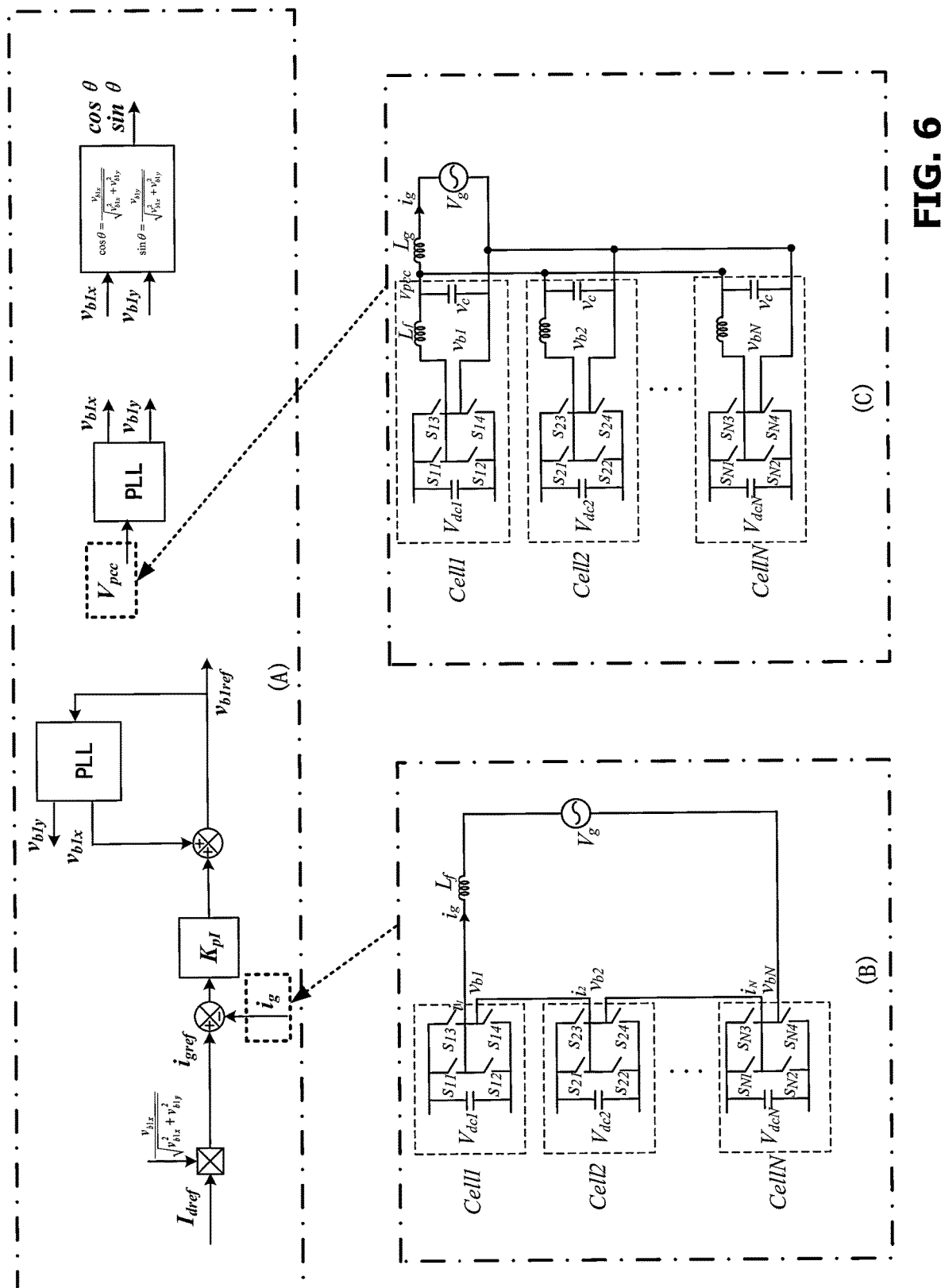
FIG. 6 shows a method for performing a phase-locking operation on the first electrical signal at the first terminal in a series system or a parallel system according to the present disclosure.

In the embodiment as shown in FIG. 3, the power conversion system 100-1 may be, for example, a single-phase series system, in which the first terminals of the N power conversion cells CELL1, CELL2, . . . , and CELLN are connected in series and connected to a one-phase input source $v_g$. Here, the first electrical signal E1 may be, for example, the current $i_g$ flowing through the first terminal (for example, the grid current in FIG. 3). However, it is to be understood that, in other embodiments, the power conversion system 100-1 may alternatively be a single-phase parallel system, in which, for example, the first terminals of the N power conversion cells CELL1, CELL2, . . . , and CELLN in part (C) of FIG. 6 may be connected in parallel. Here, the first electrical signal, for example, may be the voltage at the first terminal, i.e., the voltage $V_{pec}$ at a parallel port as shown in part (C) of FIG. 6.

In the single-phase series system or the single-phase parallel system according to the present disclosure, each of the first information is, for example, a variable value or an integral value of the current, the voltage, the power or temperature of the corresponding power conversion cell. The common mode information is, for example, a mean value of the first information of all the power conversion cells.

Figure 8A:
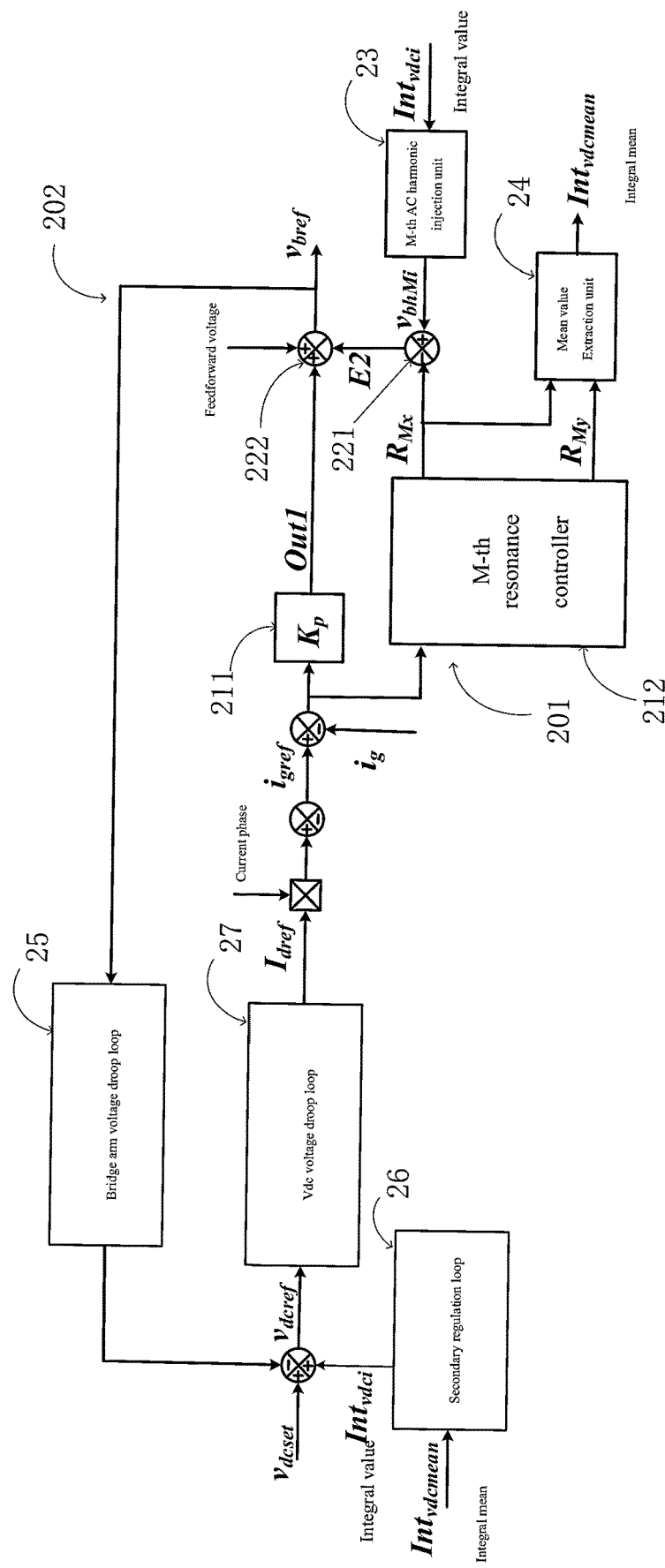
FIG. 8A shows a control block diagram for an AC-DC stage of each of the power conversion cells when the method for obtaining the mean value according to the present disclosure is used for a simulated control in the power electronic transformer system as shown in FIG. 1A.

With continued reference to FIG. 3 and with reference to FIG. 8A, in the present disclosure, each controller 20 (take the controller 1 as an example) may include, for example, a current inner-loop control unit 201 and a voltage outer-loop control unit 202. Each current inner-loop control unit 201 may generate a voltage reference value (for example, $v_{bref}$) at the first terminal of the corresponding power conversion cell (for example CELL1) according to the current (for example, $i_g$) at the first terminal, a current reference value (for example, $i_{gref}$) at the first terminal, and the injected AC harmonic (for example, $v_{bhM}$ in FIG. 3 and $v_{bhMi}$ in FIG. 8A) of the corresponding power conversion cell (for example CELL1); and each voltage outer-loop control unit 202 generates the current reference value (for example, $i_{gref}$) at the first terminal of the power conversion cell (for example CELL1) according to the voltage reference value (for example, $v_{bref}$) at the first terminal of the corresponding power conversion cell (for example CELL1), so that each of the power conversion cells applies a double loop control.

With continued reference to FIG. 3 and with reference to FIG. 8A, in some embodiments of the present disclosure, each current inner-loop control unit 201 may include, for example, a resonance control unit 21 and a first arithmetic unit 22. Each resonance control unit 21 may include a first proportional controller 211 and an Mth-order resonance controller 212, where, M may be a positive integer greater than 1. The resonance control unit 21 may be, for example, a PR controller including a $K_P$ controller and an Mth-order resonance controller. In one embodiment, M, for example, equals to 3. That is, the Mth-order resonance controller may be a third-order resonance controller, for performing a harmonic control on the current at the first terminal and the current reference value at the first terminal of the corresponding power conversion cell, to output a third-order harmonic signal correspondingly. The first proportional controller 211 may be configured to perform a proportional operation on the current (for example, $i_g$) at the first terminal and the current reference value (for example, $i_{gref}$) at the first terminal of the corresponding power conversion cell, to output a first output signal (for example, Out1) correspondingly. The Mth-order resonance controller 212 may be configured to perform a harmonic control on the current (for example, $i_g$) at the first terminal and the current reference value (for example, $i_{gref}$) at the first terminal of the corresponding power conversion cell, to output an Mth-order harmonic signal (for example, $R_M$) correspondingly. The first arithmetic unit 22 may be configured to generate the voltage reference value (for example, $v_{bref}$) at the first terminal of the power conversion cell correspondingly according to the first output signal (for example, Out1), the Mth-order harmonic signal (for example, $R_M$) and the injected AC harmonic (for example, $v_{bhM}$ in FIG. 3 and $v_{bhMi}$ in FIG. 8A) of the corresponding power conversion cell. The Mth-order harmonic signal is the second electrical signal including the common mode information (for example, the mean value of the first information of all the power conversion cells, such as an integral mean value $Int_{vdcmean}$ as shown in FIG. 8A).

With reference to FIG. 3, in some embodiments of the present disclosure, each first arithmetic unit 22, for example, may include a first arithmetic element 221 and a second arithmetic element 222. The first arithmetic element 221, for example, may be configured to generate a third electrical signal (for example, E2) of the power conversion cell according to the Mth-order harmonic signal (for example, $R_M$) and the injected AC harmonic (for example, $v_{bhM}$) of the corresponding power conversion cell. The AC harmonic (for example, $v_{bhM}$), for example, may be injected through an Mth-order AC harmonic injection unit 23 (referring to FIG. 8). The second arithmetic element 222, for example, may be configured to generate the voltage reference value (for example, $v_{bref}$) at the first terminal of the corresponding power conversion cell according to the first output signal (for example, Out1) and the third electrical signal (for example, E2) of the corresponding power conversion cell. In some embodiments, the first arithmetic unit 22 may further include a third arithmetic element 223. The third arithmetic element 223 is configured to perform an addition operation on a feedforward voltage $v_b$ (for example, an x-axis component of a phase-locked grid voltage or an x-axis component of a phase-locked bridge arm voltage, such as the x-axis component $v_{brefx}$ of $v_{bref}$) and the first output signal (for example, Out1) of the corresponding power conversion cell, to output a second output signal (for example, $v_{bref1}$). The second arithmetic element 222 is configured to generate the voltage reference value (for example, $v_{bref}$) at the first terminal of the corresponding power conversion cell according to the second output signal (for example, $v_{bref1}$) outputted from the third arithmetic element 223 and the third electrical signal (for example, E2).

With reference to FIG. 3, in some embodiments, the resonance control unit 21 may further include a fourth arithmetic element 213. The fourth arithmetic element 213 may be configured to perform a subtraction operation on the current reference value (for example, $i_{gref}$) at the first terminal and the current (for example, $i_g$) at the first terminal of the corresponding power conversion cell, and correspondingly output an operation result. The operation result is transmitted to the first proportional controller 211 and the Mth-order resonance controller 212, respectively, for performing the proportional operation and the harmonic control mentioned above.

In some embodiments of the present disclosure, as shown in FIG. 8A, each controller 20 may further include a mean value extraction unit 24 configured to extract a mean value of the first information of all the power conversion cells in the Mth-order harmonic signal (i.e., the common mode information, such as the integral mean value $Int_{vdcmean}$ in FIG. 8A).

A method for obtaining the mean value of the first information of all the power conversion cells in a case in which the first embodiment of the present disclosure is, for example, a single-phase series system or a single-phase parallel system will be described below in detail with reference to FIGS. 3~11. In the method, each of the power conversion cells performs the following steps.

Figure 5:
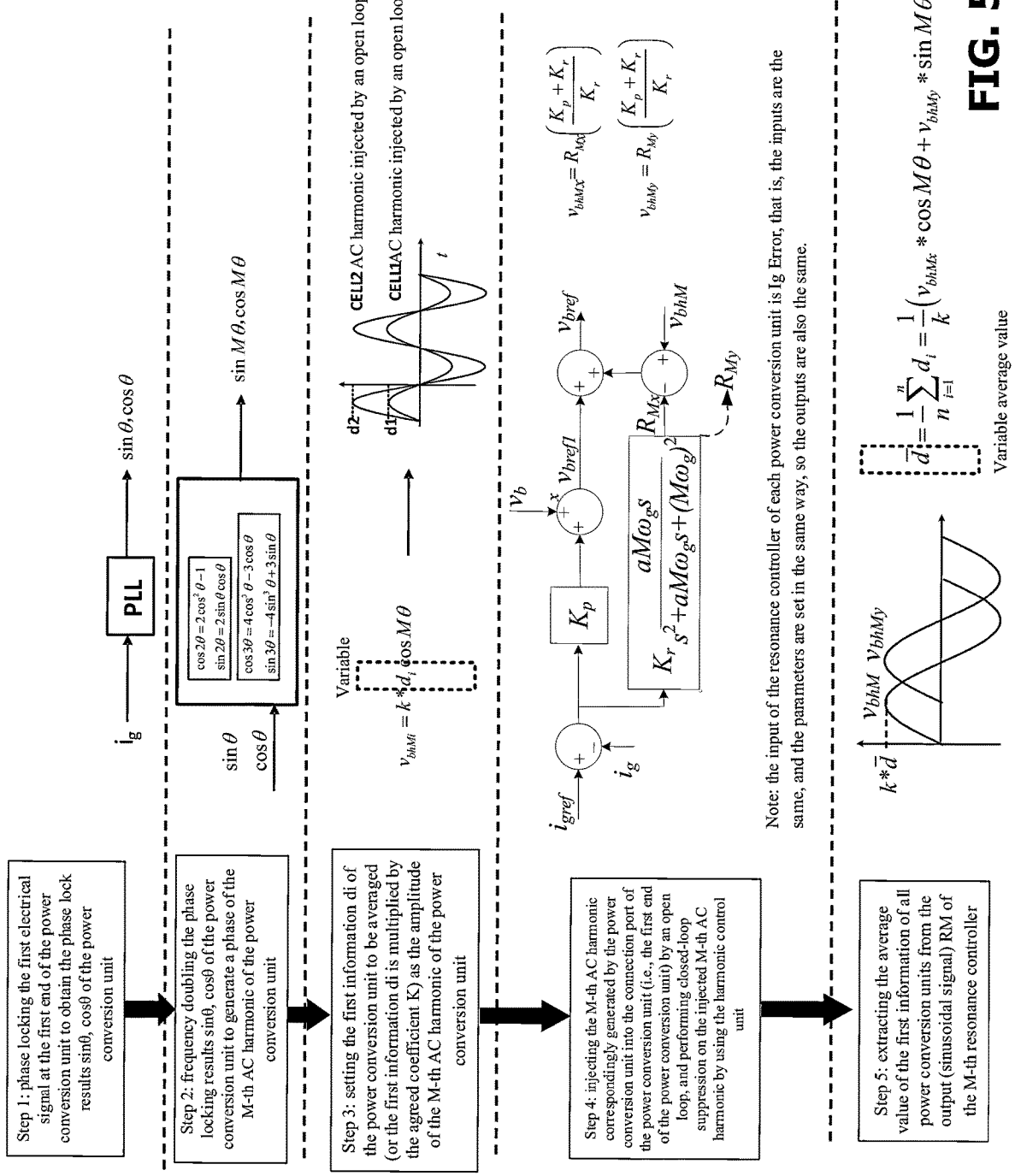
FIG. 5 shows respective steps of the method for obtaining the mean value of all the first information in the single-phase series system according to the present disclosure.

In step 1, a phase-locking operation is performed on the first electrical signal at the first terminal of the power conversion cell to obtain phase-locked results sin θ, cos θ in the power conversion cell, as shown in step 1 of FIG. 5. In a series system, the first electrical signal at the first terminal of each of the power conversion cells is a current flowing through all the power conversion cells, for example, the current $i_g$ at the series port as shown in part (B) of FIG. 6. In the parallel system, the first electrical signal at the first terminal of each of the power conversion cells is a voltage at a parallel port, for example, the voltage $V_{pcc}$ at the parallel port as shown in part (C) of FIG. 6. The specific phase-locking operation is shown in part (A) of FIG. 6. For the series system, the bridge arm voltage reference value $v_{blref}$ is obtained according to the current reference value (for example, $i_{gref}$) at the first terminal and the current (for example, $i_g$) at the first terminal of the power conversion cell. Then, the bridge arm voltage reference value $v_{blref}$ is subjected to operations such as a fundamental component extraction (for example, for extracting components $v_{blx}$, $v_{bly}$) and normalization, to obtain the phase-locked results sin θ, cos θ For the parallel system, the voltage $V_{pcc}$ at the parallel port of the power conversion cells is subjected to operations such as a fundamental component extraction (for example, for extracting components $v_{blx}$, $v_{bly}$) and normalization, to obtain the phase-locked results sin θ, cos θ.

In Step 2, a frequency doubling operation is performed on the phase-locked results sin θ cos θ of the power conversion cell to generate a phase of the Mth-order AC harmonic of the power conversion cell, as shown in step 2 of FIG. 5. Here, the frequency doubling operation may be performed according to a formula, such as cos 2θ=2 cos 2θ-1, sin 2θ=2 sin θ cos θ, etc.

In step 3, the first information $d_i$ of the power conversion cell for which the mean value is to be obtained (or the first information $d_i$ multiplied by an agreed coefficient K, K is a positive number, for example, any positive number such as 1, 1.5, 3) is set as the amplitude of the Mth-order AC harmonic of the power conversion cell, as shown in step 3 of FIG. 5. The first information $d_i$ represents a variable value of the first information of the i-th (n=1, 2, 3 . . . ) power conversion cell. The first information may be, for example, a value of an actual physical quantity such as the voltage, the current, the temperature or the power of the corresponding power conversion cell, or an integral value of any physical quantity obtained by the controller of the corresponding power conversion cell (for example, the integral value $\text{Int}_{vdci}$ of the voltage at the first terminal of the corresponding power conversion cell in FIG. 8), or a value of a virtual physical quantity such as a state of a battery, but the present disclosure is not limited thereto.

In the embodiment as shown in FIG. 3, the controller 20 of each of the power conversion cells CELL1, CELL2, ..., and CELLN generates Mth-order AC harmonic according to the first electrical signal at the series port (for example, the current at the series port) of the power conversion cells CELL1, CELL2, ..., and CELLN, and all the AC harmonics are at the same frequency. The Mth-order AC harmonics may have the same phase (for example, which may be achieved by performing the phase-locking operation on the current $i_g$ at the series port of the power conversion cell). The Mth-order AC harmonics may have different amplitudes, each of which represents the variable value of the first information of the corresponding power conversion cell.

In step 4, the Mth-order AC harmonic generated by the corresponding power conversion cell is injected into a connection port of the power conversion cell (i.e., the first terminal of the power conversion cell) in an open-loop manner, and a closed-loop suppression is applied to the injected Mth-order AC harmonic by using the resonance control unit, as shown in step 4 of FIG. 5. Step 4 is controlled and executed in the current inner-loop control unit 201. The output $R_M$ of the resonance control unit may counteract the Mth-order AC harmonic injected in the open-loop manner.

The resonance control unit (for example, the PR controller in FIG. 3) according to the present disclosure includes the first proportional controller 211 (i.e., the $K_P$ controller) and the Mth-order resonance controller 212. As compared with the conventional proportional controller, the Mth-order resonance controller 212 is added in the resonance control unit in the present disclosure. $K_P$ indicates a parameter of the first proportional controller 211. The Mth-order resonance controller may be expressed by the expression $$K_r \frac{\alpha M \omega_g s}{s^2 + \alpha M \omega_g s + (M \omega_g)^2},$$

where $K_r$ represents a magnitude of the gain, and $\alpha$ represents a bandwidth. An input of the Mth-order resonance controller is set as the current $i_g$ at the first terminal and the current reference value $i_{gref}$ at the first terminal of the corresponding power conversion cell. $R_{Mx}$ and $R_{My}$ are two outputs of the Mth-order resonance controller that are orthogonal to each other. $i_{gref}$ does not include the Mth-order harmonic component. $R_{Mx}$ outputted by the Mth-order resonance controller multiplied by $(1+K_p/K_r)$ is equal to a total output of the PR controller, which is superposed on the Mth-order AC harmonic $v_{bhM}$ injected in the open-loop manner to counteract the Mth-order AC harmonic $v_{bhM}$. That is, $R_{Mx}$ outputted by the Mth-order resonance controller may counteract the Mth-order AC harmonic $v_{bhM}$ injected in the open-loop manner. Since the input of the Mth-order resonance controller of each of the power conversion cells is the same and, and the parameters of the resonance control unit of each of the power conversion cells are also set the same, so the output of the Mth-order resonance controller of each of the power conversion cells is the same. Therefore, the mean value of the first information of all the power conversion cells (i.e., the common mode information) may be extracted from the output (for example, $R_M$) of each Mth-order resonance controller.

In step 5, the mean value of the first information of all the power conversion cells is extracted from the output (a sinusoidal signal) $R_M$ of the Mth-order resonance controller, as shown in step 5 of FIG. 5. Specifically, $R_M$ may be rotated to a coordinate system oriented according to the Mth-order AC harmonic $v_{bhM}$ injected in the open-loop manner, in which a d-axis component represents the amplitude of $R_M$ and $\bar{d}$ indicates the mean value of the first information of all the power conversion cells. $\bar{d}$ may be calculated according to the following expression:

$$\bar{d} = \frac{1}{n}\sum_1^n d_i = \frac{1}{k}(v_{bhMx} * \cos M\theta + v_{bhMy} * \sin M\theta) \text{ where,}$$

$$v_{bhMx} = R_{Mx}\left(\frac{K_p + K_r}{K_r}\right),$$

$$v_{bhMy} = R_{My}\left(\frac{K_p + K_r}{K_r}\right).$$

Each of the power conversion cells may extract the mean value of the first information of all the power conversion cells (i.e., the common mode information) from $R_M$ outputted by the corresponding Mth-order resonance controller, where $R_M$ is the second electrical signal including common mode information.

The method for obtaining the mean value of the first information of all the power conversion cells according to the present disclosure that is applicable in a single-phase series system or a single-phase parallel system has the following technical advantages:

(1) The controllers of respective power conversion cells CELL1, CELL2, ..., and CELLN may suppress the respective injected Mth-order AC harmonics simultaneously. In this way, the speed for obtaining the mean value of the first information of all the power conversion cells (i.e., the common mode information) is fast, and is independent of the number of power conversion cells in series or in parallel, which facilitates expanding the capacity of the system.

(2) In the present disclosure, the mean value of the first information of all the power conversion cells is obtained without relying on additional communication lines, thereby reducing the production cost.

(3) The AC harmonic injected into the connection port (i.e. the first terminal) of the power conversion cell is suppressed, which substantially brings no harmonic pollution to the power conversion system, thereby improving the voltage quality. Further, the AC harmonics at the same frequency are injected into each of the power conversion cells, which occupies a narrower frequency band and may be controlled easily.

Figure 4:
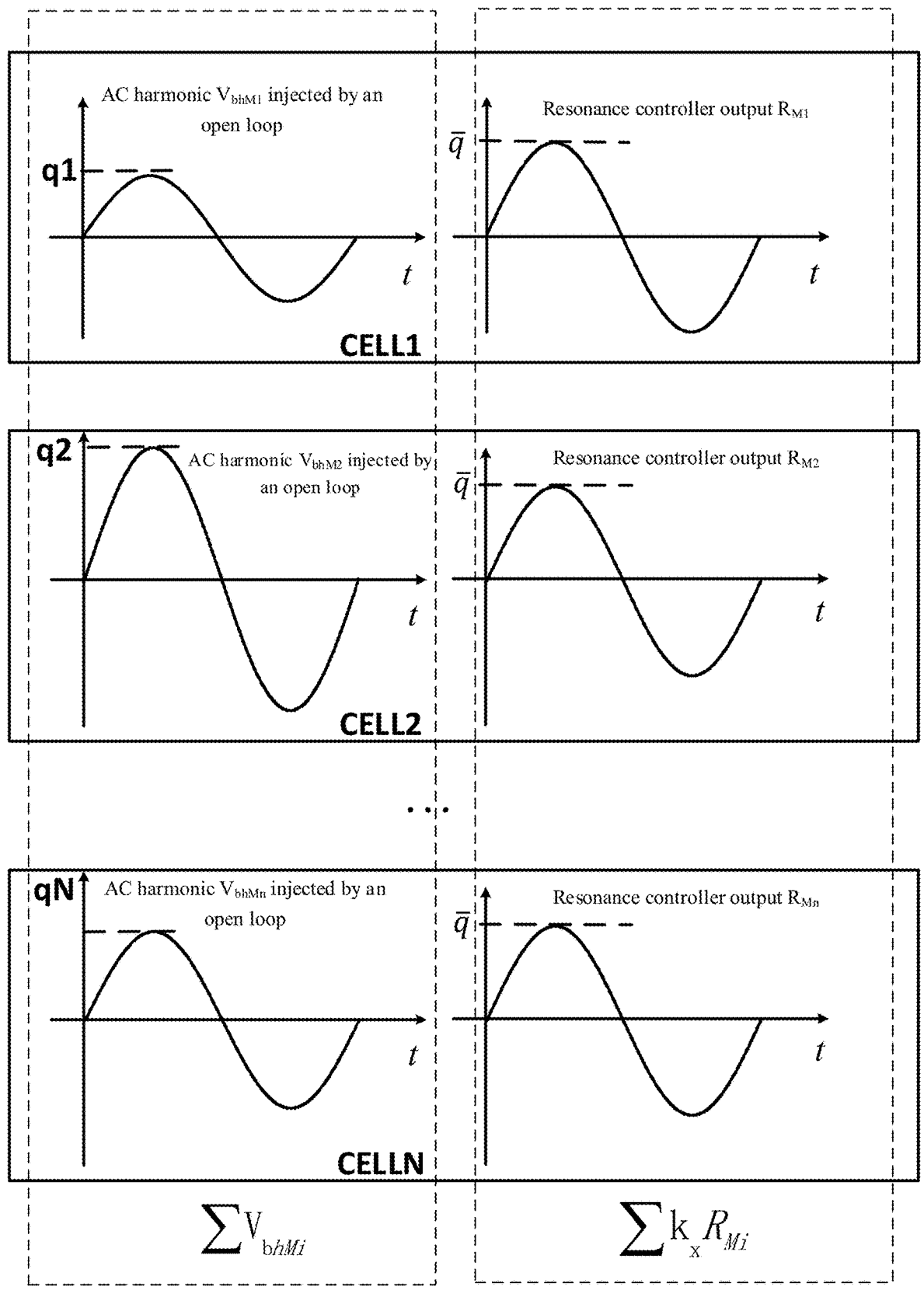
FIG. 4 shows effects of obtaining a mean value of all the first information in the single-phase series system in FIG. 3.

Next, by taking the single-phase series system as an example, a basic principle of the above method for obtaining the mean value of the first information will be described. In the embodiment as shown in FIG. 3, each of the power conversion cells CELL1, CELL2, ..., and CELLN injects Mth-order AC harmonics with the same phase into the series port in the open-loop manner. Here, the amplitude of the Mth-order AC harmonic represents the variable value of the first information of each of the power conversion cells CELL1, CELL2, ..., and CELLN for which the mean value is to be obtained. Therefore, the amplitude s of the Mth-order AC harmonics injected by each of the power conversion cells CELL1, CELL2, . . . , and CELLN may not necessarily be the same. As shown in FIG. 4, since the power conversion system in FIG. 3 is the series system, the Mth-order AC harmonic finally injected into the port is a sum of the Mth-order AC harmonics injected by respective power conversion cells CELL1, CELL2, . . . , and CELLN (for example, $V_{bhM1}$, $V_{bhM2}$, . . . $V_{bhMn}$), expressed by $\Sigma V_{bhMi}$. Each resonance control unit (for example, the PR controller) may suppress the AC harmonic in the first electrical signal (for example, the grid current $i_g$) at the series port of the corresponding power conversion cell. By setting the same value of $K_P$ for all the power conversion cells CELL1, CELL2, . . . , and CELLN, and setting the same parameters for all the Mth-order resonance controller, the outputs of the Mth-order resonance controllers in respective power conversion cells CELL1, CELL2, . . . , and CELLN are the same, i.e., $R_{M1}=R_{M2}= \ldots =R_{Mn}$. A sum of the outputs of respective power conversion cell CELL1, CELL2, . . . , and CELLN in which the AC harmonics have been suppressed by the PR controller is expressed by $\Sigma k_x R_{Mi}$, where $$k_x = \frac{K_p + K_r}{K_r},$$

$K_r$ represents the magnitude of the gain, and $K_P$ is the parameter of the proportional controller. When the circuit reaches a steady state, the Mth-order AC harmonic in the grid current $i_g$ is almost suppressed to be zero. At the time, $\Sigma k_x R_{Mi} \approx \Sigma V_{bhMi}$, where $R_{Mi}$ reflects a mean value of the amplitudes of the injected Mth-order AC harmonics. Since the Mth-order AC harmonics are injected into the series ports of respective power conversion cells CELL1, CELL2, . . . , and CELLN simultaneously, and are then subjected the harmonic suppression by means of the respective corresponding PR controllers with the same control parameters, the obtaining of the mean value, i.e. the transmission of the common mode information, according to the method, may not be affected by the number n of the power conversion cells.

Furthermore, the speed for obtaining the mean value in the method mainly depends on the speed for extracting the harmonics, that is, being affected by the parameters of the Mth-order resonance controller. A transfer function of the Mth-order resonance controller is $$K_r \frac{rs}{s^2 + rs + (M\omega_g)^2}.$$

Figure 7A:
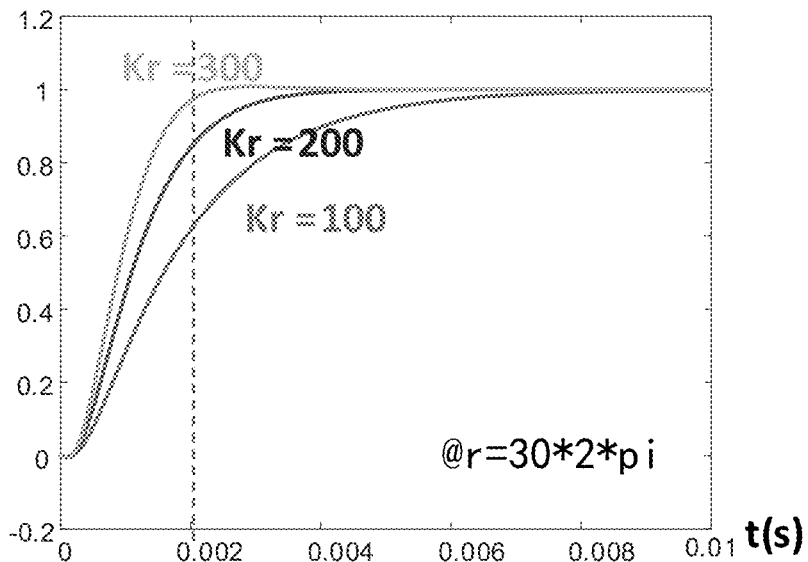
FIG. 7A shows a step response relationship between the gain of the resonance controller of the present disclosure and the obtaining of the mean value.
Figure 7B:
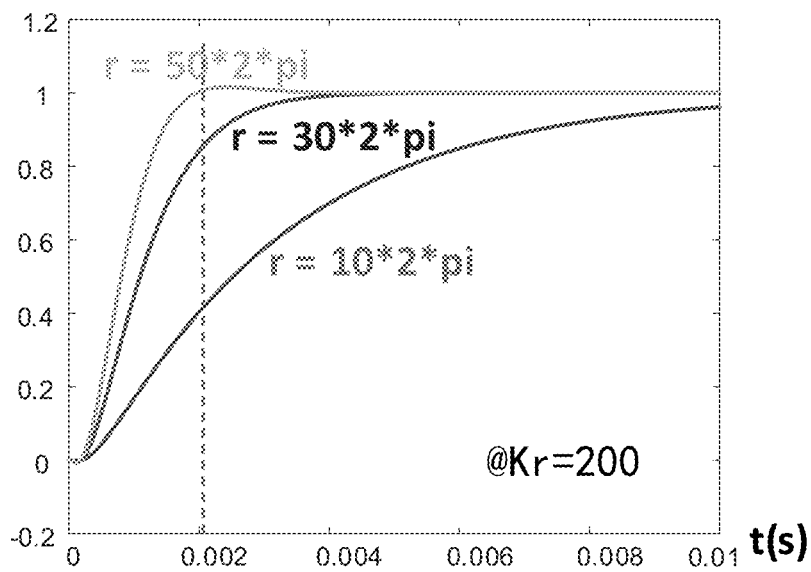
FIG. 7B shows the step response relationship between the bandwidth of the resonance controller of the present disclosure and the obtaining of the mean value.

Step responses for obtaining the mean value is shown in FIG. 7A and FIG. 7B. The parameters of the Mth-order resonance controller are modified in a case in which a filter inductance $L_f$ at the grid side is 15 mH, the control frequency is 10 k, and Kp=50. As can be seen from FIG. 7A, the larger the gain $K_r$ of the Mth-order resonance controller is, the faster the response is; and from FIG. 7B, the wider the bandwidth r of the Mth-order resonance controller is, the faster the response is. As can be seen from FIG. 7A and FIG. 7B, by designing the values of $K_r$ and r reasonably, the speed for obtaining the mean value may be up to 2 ms.

Simulation of Effects of the First Embodiment

Figure 1A:
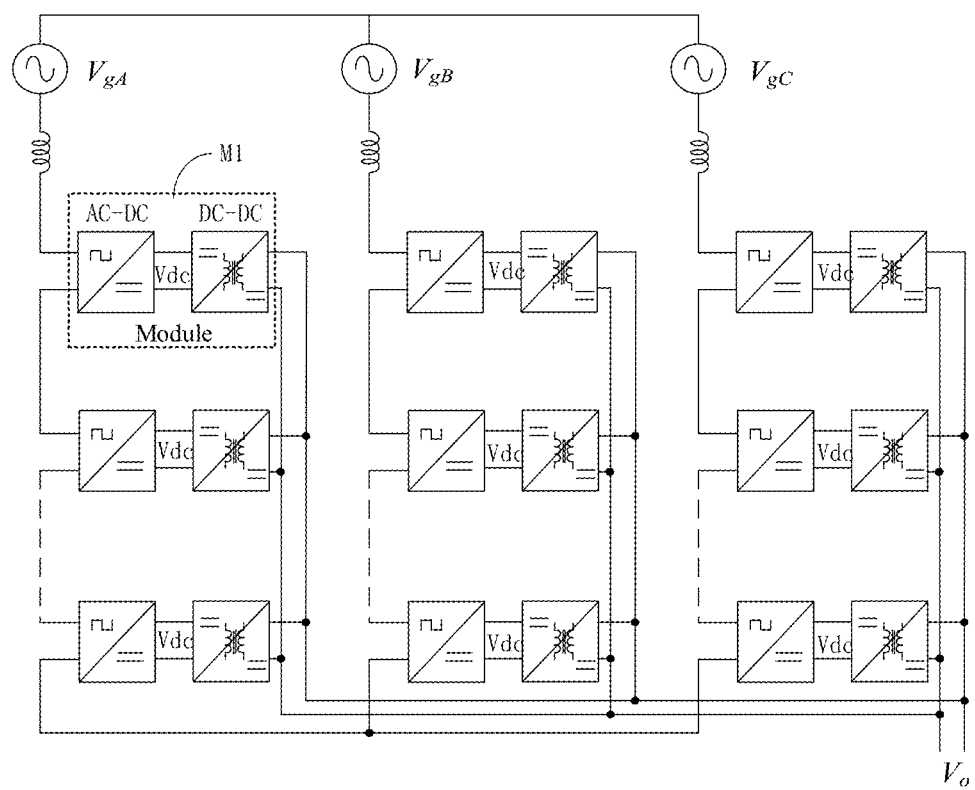
FIG. 1A is a composition diagram of the power electronic transformer system in the prior art.
Figure 8B:
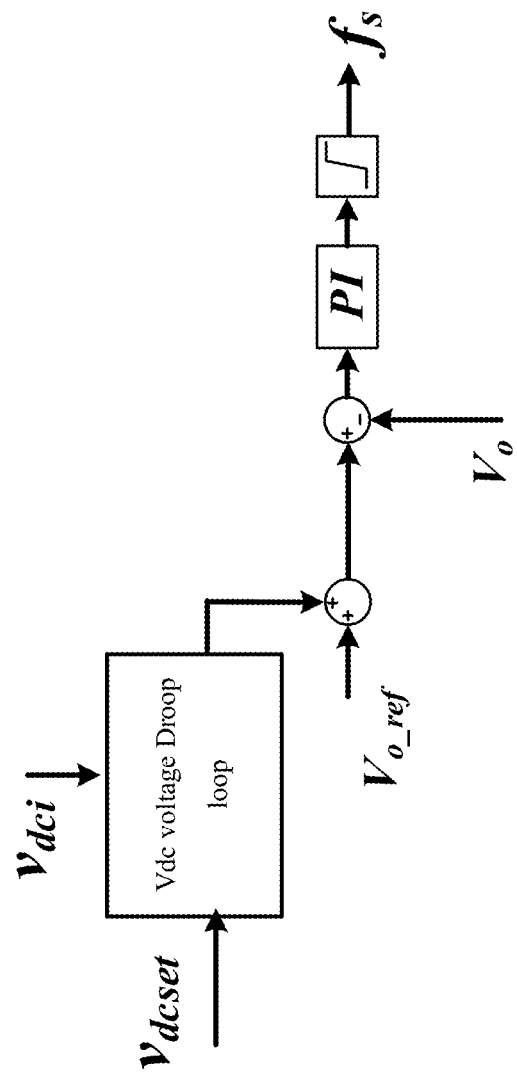
FIG. 8B shows a control block diagram for a DC-DC stage of each of the power conversion cells when the method for obtaining the mean value according to the present disclosure is used for the simulated control in the power electronic transformer system as shown in FIG. 1A.

The method for obtaining the mean value according to the present disclosure was applied in the control of the power electronic transformer system (for example, the SST system) as shown in FIG. 1A, in which the SST system only includes a single phase. The phase includes two cascaded power conversion cells CELL. Each of the power conversion cells includes two stages AC-DC and DC-DC to be controlled separately. The voltage Vdc in FIG. 1A is also referred to as the voltage DCLINK. The simulation is established in Matlab. The control block diagram for each of the power conversion cells CELL is shown in FIG. 8A and FIG. 8B, respectively. As shown in FIG. 8A, the AC-DC stage is controlled by performing the bridge arm voltage droop through a bridge arm voltage droop loop 25. The droop will cause the statical error in the control of the voltage Vdc. Therefore, an integral operation is performed by a distributed secondary regulation loop 26 to eliminate the statical error in the Vdc. In order to avoid inconsistence of the integrals of respective power conversion cells, it is necessary to obtain the mean value of the integral values so that the integrals of respective power conversion cells are consistent. The communication method according to the present disclosure may be applied, for example, to obtain the integral mean value of the outputs of the secondary regulation loop. For example, the present disclosure may extract the integral mean value $Int_{vdcmean}$ of the voltage Vdc through the mean value extraction unit 24. The integral operation is performed on the integral mean value $Int_{vdcmean}$ through the secondary regulation loop 26 to output the integral value $Int_{vdci}$. As shown in FIG. 8B, the DC-DC stage is LLC, which performs a frequency modulation control on the output voltage in the closed-loop manner, and performs the voltage-Vdc droop control by using the voltage-Vdc droop loop.

It is assumed that the voltage Vdc is set to a fixed value 780V, and the output voltage Vo is set to 350V.

Figure 9:
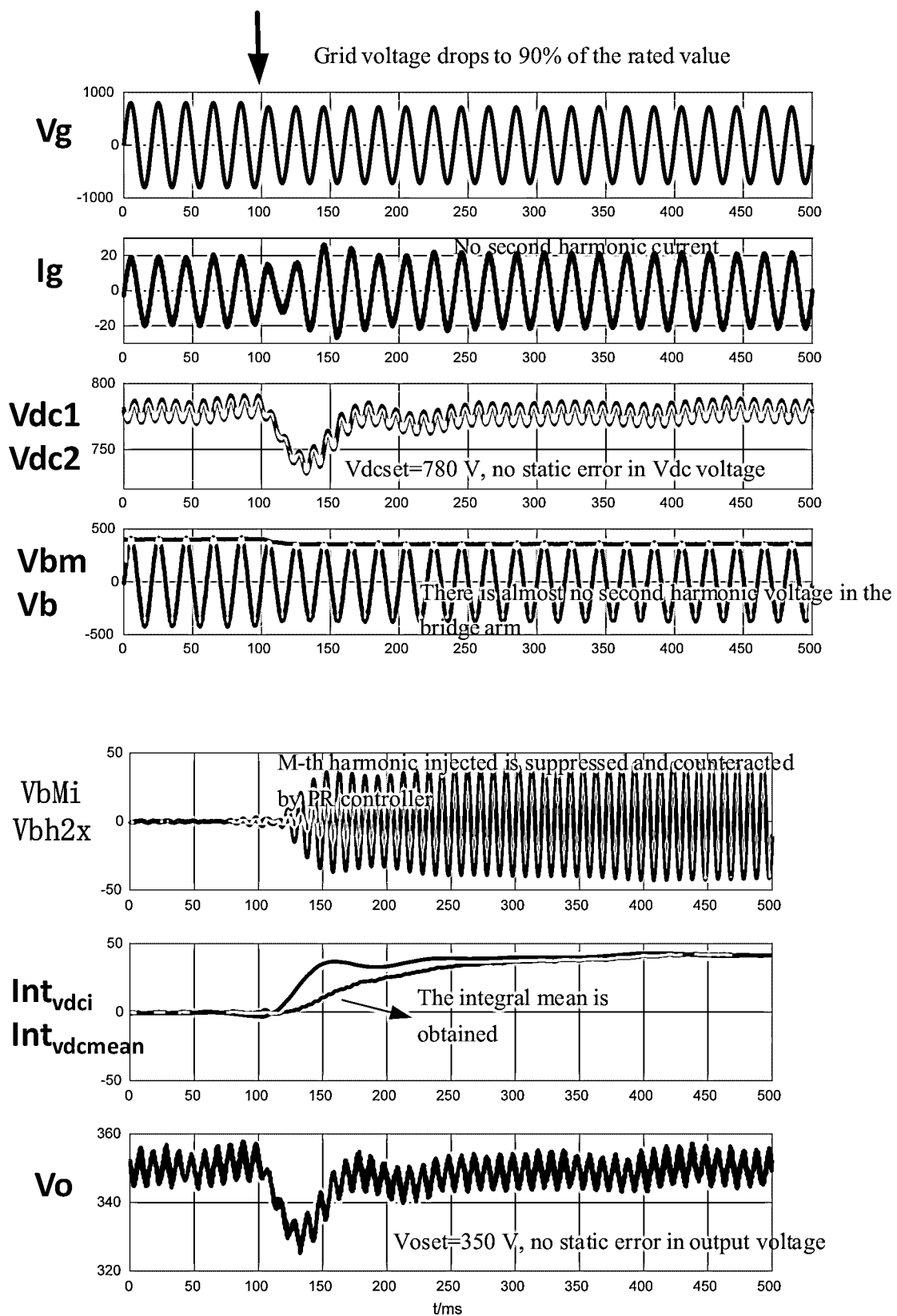
FIG. 9 shows simulated results obtained after the simulated control.

FIG. 9 shows the simulation results. As can be seen, at 0.1 s, the grid voltage drops to 90% of a rated value. At the time, a given droop value of the bridge arm voltage in the AC-DC stage deviates from a set value. Due to the droop control for the bridge arm voltage, the voltage DCLINK, i.e. Vdc, drops. Since the droop control for Vdc is applied in the DC-DC stage, the output voltage Vo also drops. Since the method of the present disclosure performs the secondary regulation for Vdc and obtains the integral mean valu, the output voltage Vo starts to recover, such that there is no statical error in the stabilized output voltage. It proves the effects that the method for obtaining the mean value according to the present disclosure may facilitate eliminating the statical error in droop control.

Figure 10:
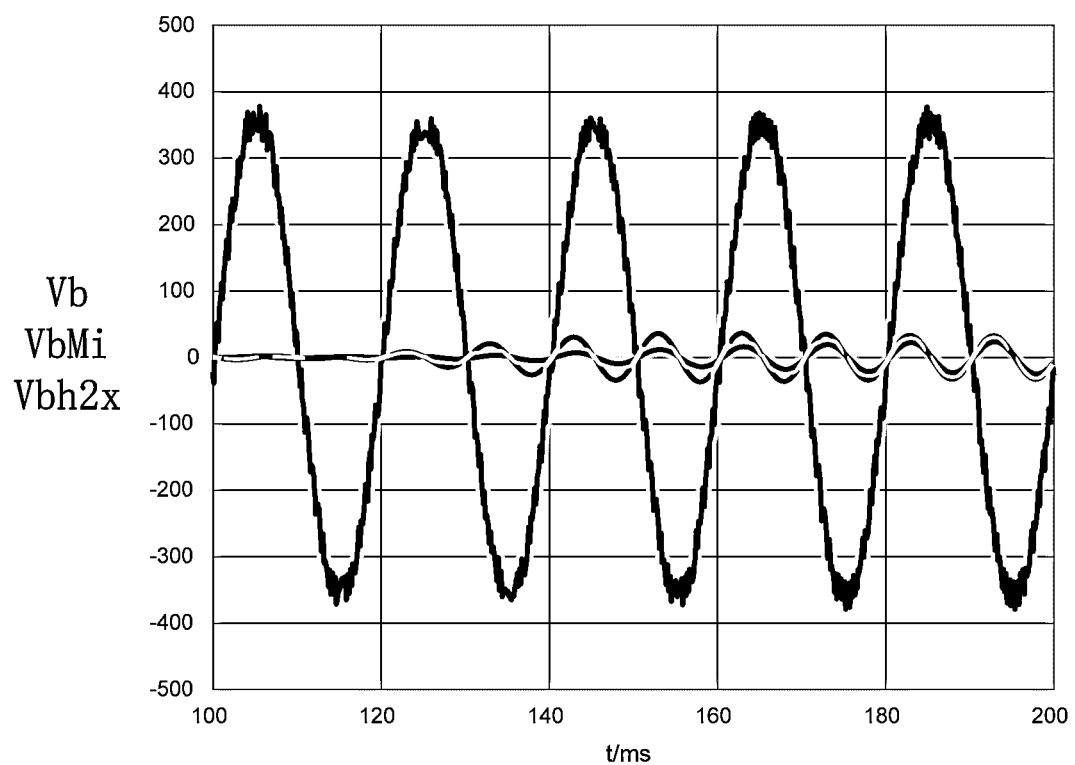
FIG. 10 shows effects of injection and counteraction of harmonics when obtaining the mean value of all the first information according to the present disclosure.

FIG. 10 clearly shows the process of injection and counteraction of the AC harmonics when the mean value is obtained according to the present disclosure. Here, Vb is a total bridge arm voltage, VbMi is the Mth-order AC harmonic injected in the open-loop manner, and Vbh2x is the output of the PR controller, for counteracting the Vbh2 injected in the open-loop manner.

Figure 11:
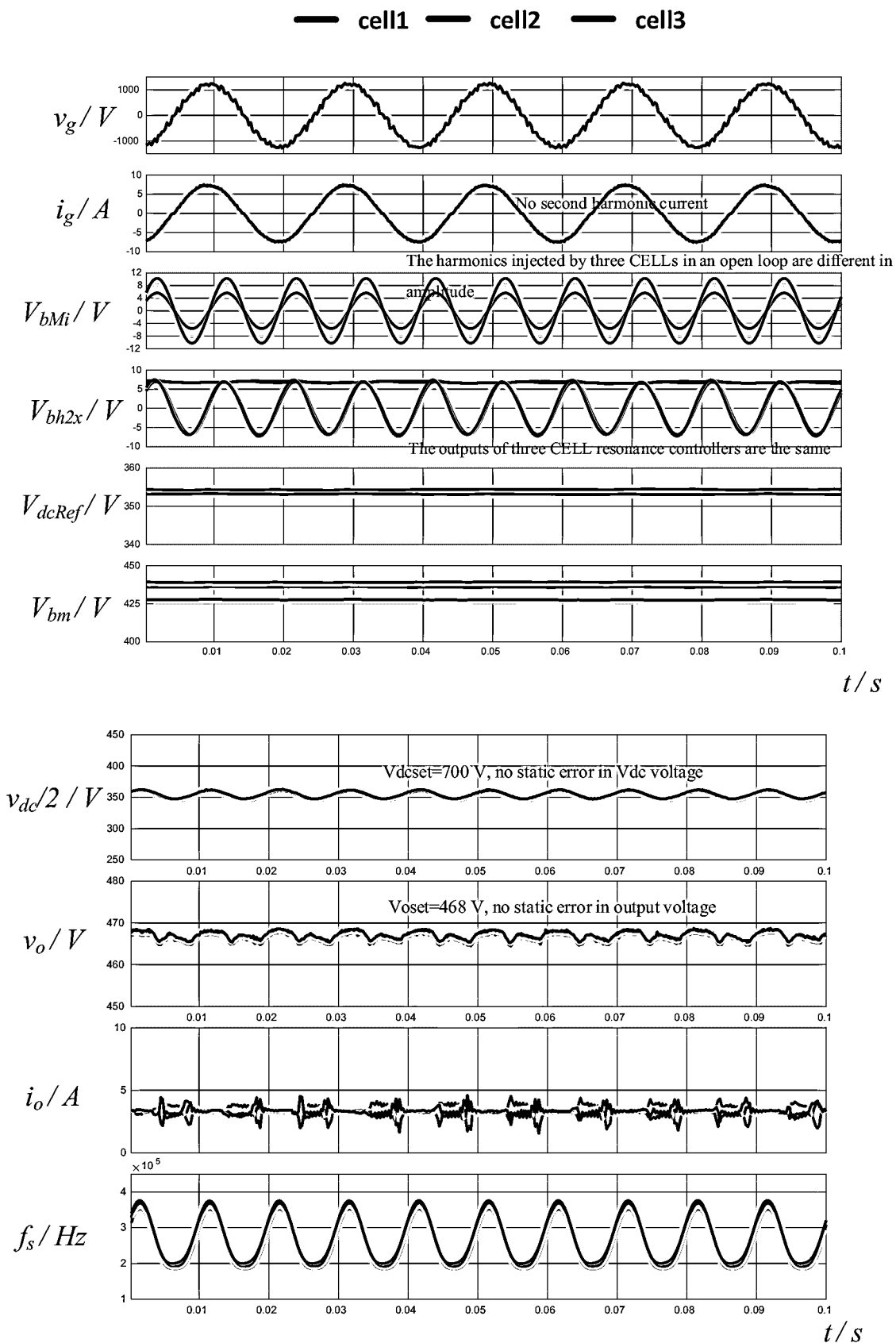
FIG. 11 shows experimental effects of the first embodiment of the present disclosure.

Experimental effects of the first embodiment are as shown in FIG. 11. The experiment is carried out in the case in which three single-phase power conversion cells CELL1, CELL2 and CELL3 are cascaded. The AC-DC stage in the power conversion cell is implemented as a Totem-Pole PFC module, and the DC-DC stage is implemented as an LLC. The outputs are connected in parallel, to be supplied to an electronic load. An effective value of the grid voltage is 880V. The filter inductance at the grid side is $L_f$=15 mh. A control frequency is 12K. The values of the parameters related to the extraction of the mean value are set as follows: $K_p$=30, $K_r$=50, α=0.01. The set value of voltage DCLINK is 700V. The set value of the output voltage is 468V. The set value of the amplitude of the grid voltage is 410V. The grid voltage is adjusted to be 105% of the set value. At the time, since the given droop value of the amplitude of the bridge arm voltage Vbm in the AC-DC stage deviates from the set value, Vdc will drop. Then, the secondary regulation loop integrates over the error of Vdc and output it. The effects of a steady-state waveform experiment is shown in FIG. 11. As can be seen, the method of the present disclosure may successfully obtain the integral mean value, and use the integral mean value for the secondary regulation, to obtain Vdc without the statical error and the output voltage without the statical error, and cause no pollution to the grid current.

The second embodiment of the present disclosure is a distributed zero-sequence component injection method applied to a three-phase Y-connected system.

As shown in FIG. 12, the power conversion system 100-2 according to the second embodiment is, for example, a three-phase Y-connected system, which may include three Y-connected power conversion cells CELLA, CELLB and CELLC. The first terminal of each of the power conversion cells CELLA/CELLB/CELLC includes a positive input terminal and a negative input terminal, respectively. The positive input terminal of each of the power conversion cells CELLA/CELLB/CELLC is correspondingly connected to an input source in one phase (for example, $v_{gA}$, $v_{gB}$, $v_{gC}$). The negative input terminals of all the power conversion cells CELLA, CELLB and CELLC are connected commonly (for example, connected to node N1 commonly). Each of the power conversion cells CELLA, CELLB and CELLC includes a controller 20 which includes a resonance control unit 21.

In the second embodiment, the controller 20 further includes a current inner-loop control unit 201 and a voltage outer-loop control unit 202. Each current inner-loop control unit 201 further includes a resonance control unit 21 and a first arithmetic unit 22. The resonance control unit 21 further includes a first proportional controller 211 and an Mth-order resonance controller 212. The composition and operation of the current inner-loop control unit 201, the voltage outer-loop control unit 202, the resonance control unit 21 and the first arithmetic unit 22 are basically the same as those of the first embodiment, and thus detailed description will be omitted here. Unlike the first embodiment, in the second embodiment, the Mth-order resonance controller 212 is implemented as a third-order resonance controller which is configured to perform the harmonic control on the current (for example, $i_g$) at the first terminal and the current reference value (for example, $i_{gref}$) at the first terminal of the corresponding power conversion cell so as to output a third-order harmonic signal (for example, $R_3$) correspondingly. The third-order harmonic signal is a second electrical signal related to the first information, which may be further used to generate the common mode information (for example, the zero-sequence component) for the corresponding power conversion cell with the injected AC harmonic (for example, $v_{bh3}$). Correspondingly, the first arithmetic unit 22 is configured to generate the voltage reference value (for example, $v_{bref}$) at the first terminal of the corresponding power conversion cell according to the first output signal (for example, Out1), the third-order harmonic signal (for example, $R_3$) and the injected AC harmonic (for example, $v_{bh3}$) of the corresponding power conversion cell. Furthermore, the first arithmetic element 221 in the first arithmetic unit 22 is configured to generate the zero-sequence component (for example, $v_{bh30}$) of the corresponding power conversion cell according to the third-order harmonic signal (for example, $R_3$) and the injected AC harmonic (for example, $v_{bh3}$) of the corresponding power conversion cell. The zero-sequence component is the common mode information. The second arithmetic element 222 in the first arithmetic unit 22 is configured to generate the voltage reference value (for example, $v_{bref}$ of the first terminal of the corresponding power conversion cell according to the first output signal (for example, Out1) and the zero-sequence component (for example, $v_{bh30}$) of the corresponding power conversion cell.

Figure 13:
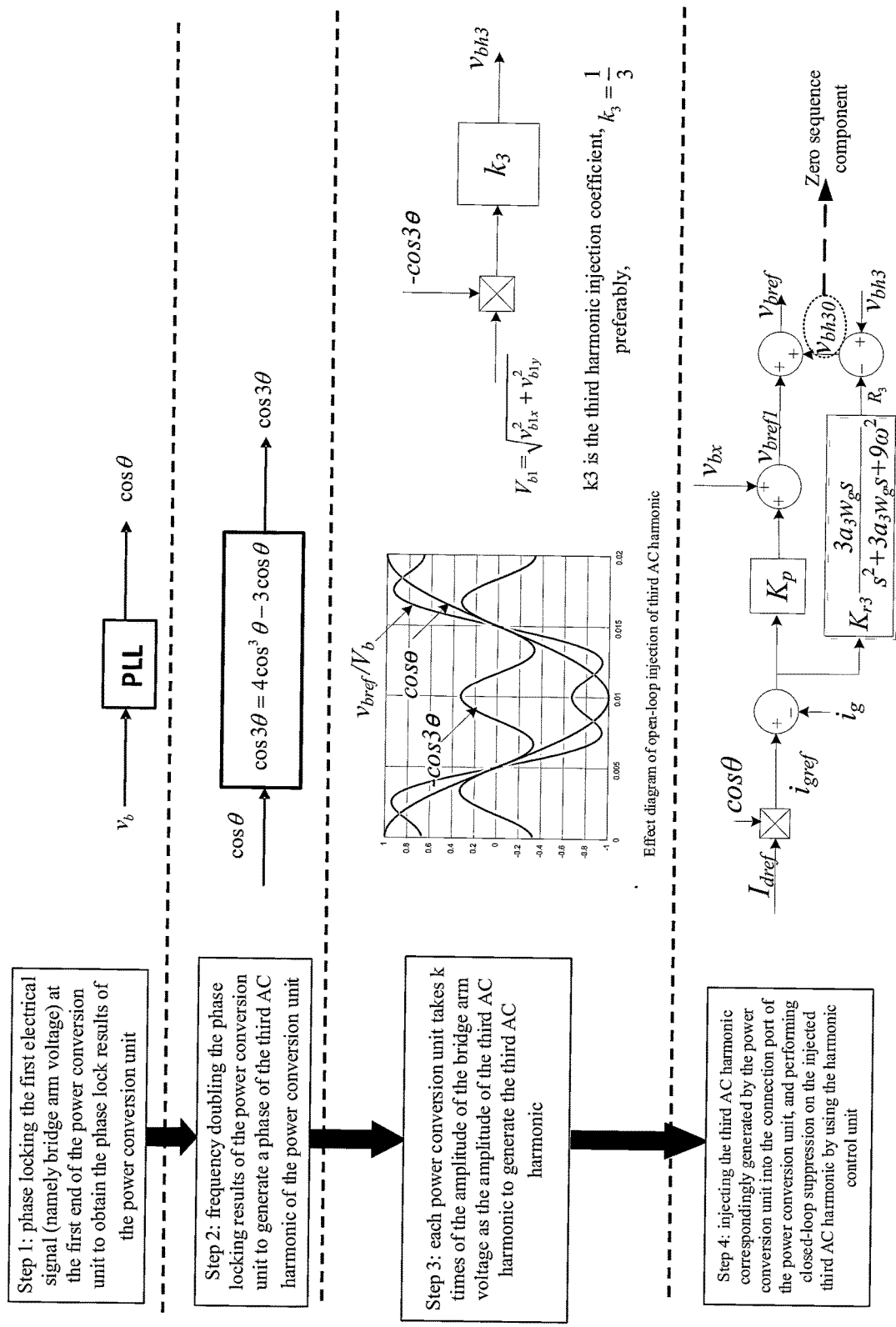
FIG. 13 shows respective steps of the distributed zero-sequence component injection method of the three-phase system according to the present disclosure.

The distributed zero-sequence component injection method in the three-phase Y-connected system in the second embodiment is basically the same as the method for obtaining the mean value of the first information of all the power conversion cells applied to the single-phase series system or the single-phase parallel system to the first embodiment, and thus detailed description will be omitted here. Unlike the first embodiment, as shown in FIG. 12, in step 1, the first electrical signal at the first terminal of each of the power conversion cells, for example, is the bridge arm voltage $v_{bA}$, $v_{bB}$, $v_{bC}$ of the corresponding power conversion cell. Further, in step 3, K times of the amplitude of the bridge arm voltage (i.e., the voltage at the first terminal of the power conversion cell) is set as the amplitude of the third-order AC harmonic in each of the power conversion cells, where K is a positive number, and preferably K=⅓. That is, the first information of each of the power conversion cells is a third of the amplitude of the first electrical signal of the corresponding power conversion cell. Further, in step 5, the first arithmetic element 221 is configured to generate the zero-sequence component (for example, $v_{bh30}$ in FIG. 12, i.e., the common mode information) of the power conversion cell according to the third-order harmonic signal (for example, $R_3$) and the injected third-order AC harmonic (for example, $v_{bh3}$) of the corresponding power conversion cell. The specific steps are shown in step 1 to step 5 of FIG. 13, and thus detailed description will be omitted here.

In the second embodiment, the controller 20 of each single-phase power conversion cell CELLA/CELLB/CELLC injects the third-order AC harmonic which is synchronized with the phase of the fundamental wave of the respective bridge arm voltage and preferably has the amplitude that is a third of that of the fundamental wave, into the bridge arm voltage of the respective phase in the open-loop manner. The PR controller of the resonance control unit (including the $K_P$ controller and the third-order resonance controller) performs the closed-loop suppression on the third-order AC harmonic, and provides the output which counteracts a positive-sequence component or a negative-sequence component in the third-order AC harmonic injected in the open-loop manner, to finally obtain the zero-sequence component in the third-order AC harmonic, thereby implementing the injection of the zero-sequence component (for example, $v_{bh30}$ in FIG. 12) (that is, the transmission of the common mode information). Since the current in the three-phase Y-connected system may reflect the positive-sequence component or the negative-sequence component in the bridge arm voltage, it does not reflect the zero-sequence component. Therefore, when the harmonic control reaches the steady state, the output of the resonance controller counteracts the positive-sequence component or the negative-sequence component in the third-order AC harmonic injected in the open-loop manner. Finally, only the zero-sequence component is remained in the bridge arm voltage of each of the power conversion cells. In the second embodiment, the first electrical signal is the voltage at the first terminal of the power conversion cell (i.e., the bridge arm voltage). The first information is K times of the amplitude of the first electrical signal, where K is a positive number. The common mode information is the zero-sequence component of the voltage at the first terminal of the power conversion cell.

Furthermore, the function of the third-order resonance controller may be explained by means of the superposition theorem as shown in FIG. 14. Assuming that the third-order AC harmonic $v_{bh3A}$ is only injected into the phase-A bridge arm voltage in the open-loop manner, when the harmonic control enters the steady state, there is almost no third-order harmonic current in the line. Therefore, the final third-order harmonic of each bridge arm voltage should meet the following relationship: $v_{bh3A} \sim R_{3A} = -R_{3B} = -R_{3C}$, where $R_{3A}$, $R_{3B}$ and $R_{3C}$ are the output of the phase-A third-order resonance controller, the output of the phase-B third-order resonance controller, and the output of the phase-C third-order resonance controller, respectively.

In addition, the output of the resonance controller is proportional to the third-order AC harmonic in the current, and according to the current distribution relationship in the circuit, it is understood that $-\frac{1}{2}R_{3A} = R_{3B} = R_{3C}$. By combining the above two formulas, the following formulas may be obtained:

$$R_{3A} = \frac{2}{3} v_{bh3A},$$

$$R_{3B} = -\frac{1}{3} v_{bh3A}, \text{ and}$$

$$R_{3C} = -\frac{1}{3} v_{bh3A}.$$

When the third-order AC harmonic is injected into each phase in the open-loop manner, according to the superposition theorem, the output of each resonance controller may be obtained as follows:

$$R_{3A} = \frac{2}{3} v_{bh3A} - \frac{1}{3} v_{bh3B} - \frac{1}{3} v_{bh3C} = v_{bh3A} - V_{bh30},$$

$$R_{3B} = v_{bh3B} - v_{bh30}, \text{ and}$$

$$R_{3C} = v_{bh3C} - v_{bh30},$$

where, $$v_{bh30} = \frac{v_{bh3A} + v_{bh3B} + v_{bh3C}}{3},$$

which is the zero-sequence component of the third-order AC harmonic injected in the open-loop manner.

Therefore, the output of the third-order resonance controller includes the positive and negative sequence components. Then, the total bridge arm voltage of the power conversion cell only includes the zero-sequence component finally.

The second embodiment has the following technical advantages:
(1) The zero-sequence component injection method for the third-order AC harmonic according to the second embodiment does not require the installation of the communication lines among the three phases. The controller in each phase may sample locally the information of the bridge arm voltage in the phase, and does not sample the information of the grid voltage or the grid current in other phases.
(2) The zero-sequence component injection method for the third-order AC harmonic according to the second embodiment may improve the DC utilization ratio (15%) and reduce the fluctuation in the double frequency of DC-Link.
(3) Even when the grid voltage is asymmetric, the zero-sequence component injection method for the third-order AC harmonic according to the second embodiment may be implemented, and does not cause harmonic pollution to the system. Specifically, if grid voltages in three phases are asymmetric, the amplitudes of the third-order AC harmonics generated in respective phases are not equal to each other, and the phases of the third-order AC harmonics generated in respective phases may not be in complete accord (including not only the zero-sequence component, but also the positive and negative sequence components). At the time, the third-order harmonic current may be caused. By adding the closed-loop suppression algorithm of the third-order AC harmonic, the third-order harmonic current may basically be eliminated. Finally, the harmonic in each phase only includes the zero-sequence component $V_{bh30}$.

Simulation of Effects of the Second Embodiment

Figure 1B:
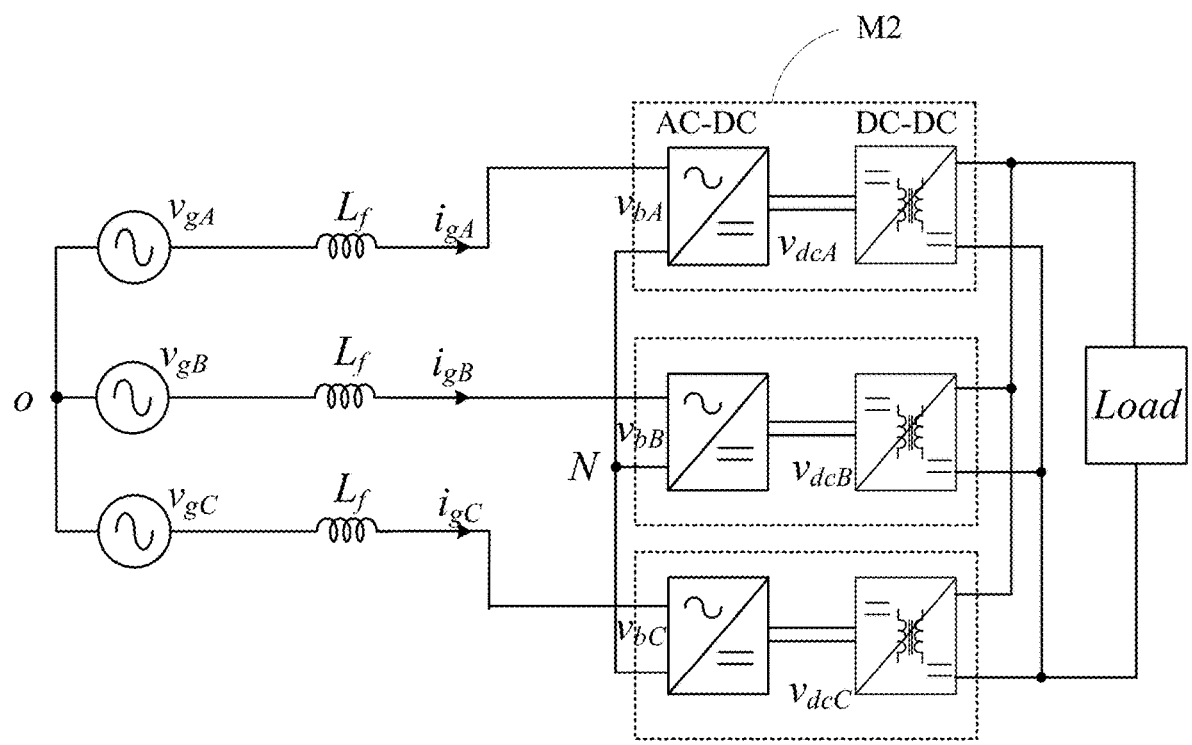
FIG. 1B is a composition diagram of the three-phase Y-connected system in the prior art.
Figure 15:
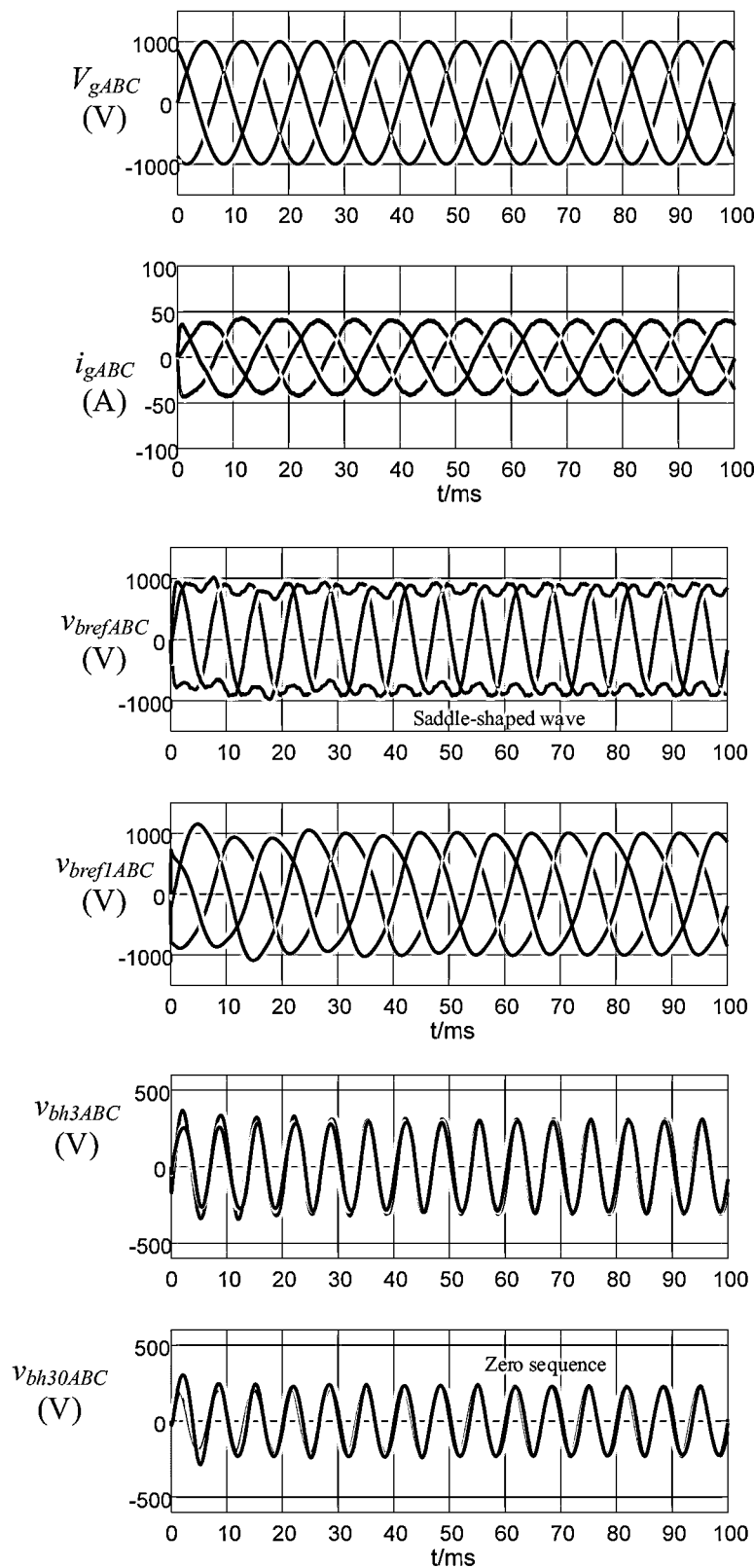
FIG. 15 shows simulated waveforms of the zero-sequence component injection method according to the present disclosure when a three-phase power grid is balanced in the three-phase Y-connected system.

The three-phase Y-connected system as shown in FIG. 1B is established in Matlab. The grid voltage is set to be 1,000V, with three phases balanced. For the sake of simplicity, the voltage DC-link is set to a fixed value 1,500V. A single current loop control is applied, with the current Idref=40 A. A Zero-sequence injection coefficient K3=0.3, with simulated waveforms shown in FIG. 15. FIG. 15 also shows that when the grid voltages in three phases are balanced, and after the zero sequence is injected, the bridge arm voltages in three phases are saddle-shaped waves (correspondingly referring to $v_{brefABC}$), which improves the utilization rate of the DC voltage, without any distortion in the three-phase current (correspondingly referring to $i_{gABC}$). The third-order harmonics injected into the bridge arm voltages in three phases in the open-loop manner are substantially equivalent to a total third-order harmonic, indicating that the output of the third-order resonance controller is substantially zero.

Figure 16:
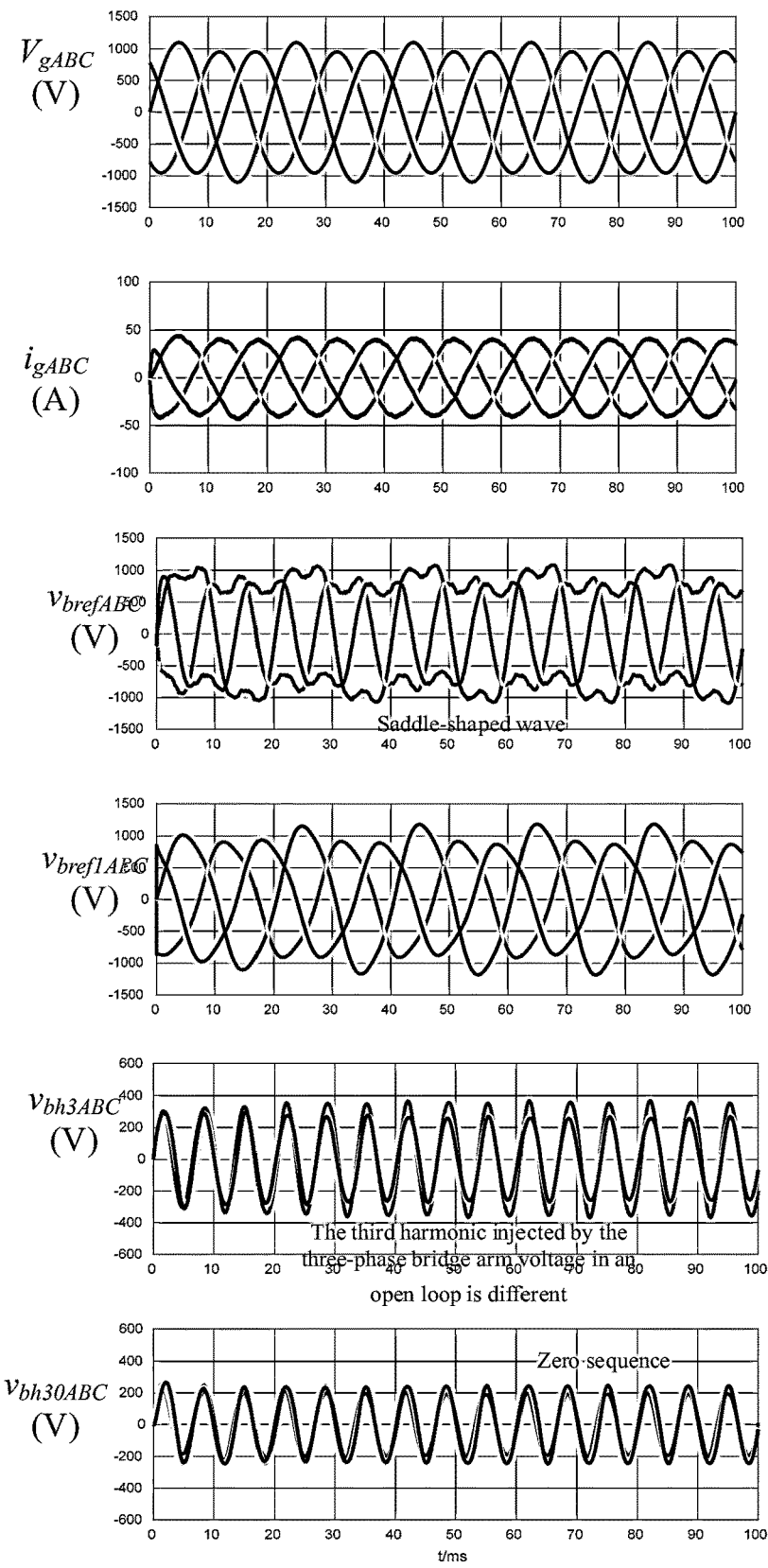
FIG. 16 shows simulated waveform of the zero-sequence component injection method according the present disclosure when the three-phase power grid is imbalanced in the three-phase Y-connected system.

FIG. 16 shows that when the grid voltages in three phases are unbalanced, and after the zero sequence is injected, the bridge arm voltages in three phases are saddle-shaped waves (correspondingly referring to $v_{brefABC}$), which improves the DC voltage utilization rate, without any distortion in the three-phase current (correspondingly referring to $i_{gABC}$). The third-order AC harmonics injected into the bridge arm voltages in three phases in the open-loop manner are different, in which the amplitude of the third-order AC harmonic injected into the phase with a higher grid voltage in the open-loop manner is larger, but the total third-order AC harmonic in each phase are basically the same, indicating that the third-order resonance controller enables the total three-phase AC harmonic to be synchronized automatically and implements the effects of zero sequence.

Part (A) and part (B) of FIG. 17 respectively show the suppression effects for the double frequency of the voltage DC-Link in a case in which the zero-sequence component is not injected and in a case in which the zero-sequence component is injected according to the present disclosure. As shown in FIG. 17, the third-order harmonics are injected such that the waveforms of the bridge arm voltages are closer to a square waveform. Also, the fluctuation in double frequency of the power obtained by multiplying the bridge arm voltage and the current is reduced. The peak value of in the fluctuation of the voltage Vdc in the figure is reduced from 80V to 50V, i.e., reduced by more than 30%.

The third embodiment of the present disclosure is the method for obtaining the mean value of all the first information applied to the three-phase Y-connected system.

As shown in FIG. 18, the power conversion system in the third embodiment of the present disclosure is, for example, a three-phase Y-connected system, which may include three Y-connected power conversion cells CELLA, CELLB and CELLC. The first terminal of each of the power conversion cells CELLA/CELLB/CELLC includes a positive input terminal and a negative input terminal, respectively. The positive input terminal of each of the power conversion cells CELLA/CELLB/CELLC is correspondingly connected to an input source in one phase (for example, $v_{gA}$, $v_{gB}$, $v_{gC}$). The negative input terminals of all the power conversion cells CELLA, CELLB and CELLC are connected commonly (for example, connected to a node N commonly). Each of the power conversion cells CELLA, CELLB and CELLC includes a controller 20 which includes a resonance control unit 21. In some embodiments, each of the power conversion cells CELLA, CELLB, CELLC may be replaced by a circuit in which N power conversion cells are connected in series as shown in FIG. 3, where N is an integer greater than 1.

In the third embodiment, the controller 20 further includes a current inner-loop control unit 201 and a voltage outer-loop control unit 202. Each current inner-loop control unit 201 further includes a resonance control unit 21 and a first arithmetic unit 22. The composition and operation of the current inner-loop control unit 201, the voltage outer-loop control unit 202, the resonance control unit 21 and the first arithmetic unit 22 are substantially the same as those of the first embodiment, and thus detailed description will be omitted here. Also, the method for obtaining the mean value of the first information of all the power conversion cells applied to the three-phase Y-connected system in the third embodiment is substantially the same as the method for obtaining the mean value of the first information of all power conversion systems applied to the single-phase series system or the single-phase parallel system in the first embodiment, and thus detailed description will be omitted here. Unlike the first embodiment, the value of M in the three-phase Y-connected system of the third embodiment cannot be a multiple of 3, and preferably M=2; and, the first electrical signal at the first terminal of each of the power conversion cells, for example, is the bridge arm voltage $v_{bA}$, $v_{bB}$, $v_{bC}$ of the corresponding power conversion cell.

Next, the principle of obtaining the mean value of the first information of all the power conversion cells in the three-phase Y-connected system according to the third embodiment will be further explained. When M=2, the Mth-order AC harmonic injected by the controller 20 of each of the power conversion cells CELLA, CELLB and CELLC in the open-loop manner is a negative sequence component. On the other hand, the negative sequence component may be suppressed by the output $R_M$ of the PR controller. Assuming that $R_{MA}$ is an output of a phase-A PR controller, according to the principle described in the second embodiment, $R_{MA}=-\frac{2}{3}V_{MA}+\frac{1}{3}V_{MB}+\frac{1}{3}V_{MC}$. As shown in FIG. 19, taking the phase A as an example, $V_{MA}$, $V_{MB}$ and $V_{MC}$ are second-order harmonics injected in three phases in the open-loop manner, with different amplitudes. Assuming that the three-phase grid is balanced, the phases of $V_{MA}$, $V_{MB}$ and $V_{MC}$ are different from each other by 120°. By rotating $R_{MA}$ to a coordinate system oriented according to $V_{MA}$ (i.e. step 5 in the first embodiment), $R_{mad}$ is obtained, with an expression of $$R_{MAd}=\tfrac{2}{3}V_{MAm}+\tfrac{1}{6}V_{MBm}+\tfrac{1}{6}V_{MCm},$$

where $V_{MAm}$, $V_{MBm}$ and $V_{MCm}$ represent the amplitudes of $V_{MA}$, $V_{MB}$ and $V_{MC}$, respectively, such that $R_{MAd}$ may represent a weighted mean value of the amplitudes of the harmonics in each phase injected in the open-loop manner. Similarly, the following expression may be obtained:

$$R_{MBd}=\tfrac{1}{6}V_{MAm}+\tfrac{2}{3}V_{MBm}+V_{MCm},$$

$$R_{MCd}=\tfrac{1}{6}V_{MAm}+\tfrac{1}{6}V_{MBm}+\tfrac{2}{3}V_{MCm}.$$

As can be seen, the method for obtaining the mean value of the first information of all the power conversion cells in the single-phase system may be directly applied to the three-phase Y-connected system. The obtained value is a three-phase weighted mean value, which is also the common mode information.

Furthermore, if an arithmetic average of the first information is to be obtained in the three-phase Y-connected system, the following transformation may be performed:

$$R'_{MAd}=2R_{MAd}-V_{MAm}$$

$$R'_{MBd}=2R_{MBd}-V_{MBm}$$

$$R'_{MCd}=2R_{MCd}-V_{MCm}$$

and then, $R'_{MAd}=R'_{MBd}=R'_{MCd}=\tfrac{1}{3}(V_{MAm}+V_{MBm}+V_{MCm})$.

Simulation of Effects of the Third Embodiment

The method for obtaining the mean value of the third embodiment is applied to the three-phase SST system as shown in FIG. 1A, in which each phase includes a power conversion cell. The control block diagram and parameters of each of the power conversion cells are completely the same as those of the power conversion cell in the first embodiment. The third embodiment is used to obtain the integral mean value of the outputs of the secondary regulation loop for the voltage Vdc.

A simulation model is established in Matlab, in which the voltage Vdc is set to be a fixed value 780V, and the output voltage is set to be 350V. The AC-DC stage in the power conversion cell is implemented as a Totem-Pole PFC module, and the DC-DC stage is implemented as an LLC. The outputs are connected in parallel, to be supplied to an electronic load. The grid voltage is 880V. The filter inductance at the grid side is $L_f$=15 mH. The control frequency is 12K. The values of the parameter values related to the extraction of the mean value are set as follows: $K_p$=30, $K_r$=50, α=0.01. The set value of the voltage Vdc is 700V. The set value of the output voltage is 468V. The set value of the amplitude of the grid voltage is 410V. The grid voltage is adjusted to be 95% of the set value. At the time, since the given droop value of the amplitude of the bridge arm voltage Vbm in the AC-DC stage deviates from the set value, Vdc will drop. Then, the secondary regulation loop integrates over the error of Vdc and output it. The effect of a steady-state waveform experiment is shown in FIG. 20. As can be seen from FIG. 20, the secondary regulation loops of all the three power conversion cells provide outputs in the steady state. Further, the second harmonics VbM2 are injected into the system, with different amplitudes in three phases. $Int_{avg}$ is an average extracted from the three phases. Since it is a weighted average of integral values, it is not exactly the same in the three phases. However, the sum of the averages in the three phases is equal to a sum of the amplitudes of the injected harmonics. Finally, the average of the voltage Vdc is 700V, and the average of the output voltage Vo is 468 v, which are the same as the set values. The experiment proves that the method for obtaining the mean value of the present disclosure may be successfully applied to the three-phase Y-connected system and may eliminate the static error caused by the droop control.

To sum up, the present disclosure may present the following technical advantages:
(1) The common mode information may be transmitted without relying on additional communication lines;
(2) The AC harmonic at the connection port of the power conversion cell may be suppressed, which substantially does not cause the harmonic pollution to the system and improves the voltage quality; and
(3) The AC harmonics at the same frequency are injected into respective power conversion cell, which occupies a narrower frequency band and may be controlled easily.

Exemplary embodiments of the present disclosure have been specifically shown and described above. It should be understood that, the present disclosure is not limited to the disclosed embodiments. On the contrary, the present disclosure is intended to cover various modifications and equivalent arrangements included in the spirit and scope of the appended claims.

What is claimed is:

1. A communication method for transmitting common mode information in a power conversion system, comprising:
   (a) providing at least two power conversion cells, first terminals of the at least two power conversion cells being electrically coupled, and each of the power conversion cells comprising a resonance control unit;
   (b) generating, by each of the power conversion cells, an AC harmonic according to a first electrical signal at the first terminal of the corresponding power conversion cell, wherein an amplitude of each AC harmonic represents first information of the power conversion cell generating the AC harmonic correspondingly, and all the AC harmonics are at a same frequency; and
   (c) injecting the AC harmonic generated by the corresponding power conversion cell into the first terminal of the corresponding power conversion cell, and applying, by the resonance control unit in the corresponding power conversion cell, a closed-loop suppression to the AC harmonic generated by the corresponding power conversion cell, and controlling the resonance control unit to output a second electrical signal related to the first information, wherein the second electrical signal comprises the common mode information of the power conversion cell, or is used to generate the common mode information of the power conversion cell with the injected AC harmonic.

2. The communication method in the power conversion system according to claim 1, wherein the step (b) of generating, by each of the power conversion cells, the AC harmonic according to the first electrical signal at the first terminal of the corresponding power conversion cell comprises:
   (b1) performing a phase-locking operation on the first electrical signal at the first terminal of the corresponding power conversion cell and performing a frequency-doubling operation on result of the phase-locking operation to generate a phase of the AC harmonic; and
   (b2) setting K times the amplitude of the first information of the power conversion cell as the amplitude of the AC harmonic, where K is a positive number.

3. The communication method in the power conversion system according to claim 1, wherein
the power conversion system is a single-phase system, and
the first terminals of the at least two power conversion cells are connected in series, and the first electrical signal is a current flowing through each of the first terminals.

4. The communication method in the power conversion system according to claim 1, wherein
the power conversion system is a single-phase system, and
the first terminals of the at least two power conversion cells are connected in parallel, and the first electrical signal is a voltage at each of the first terminals.

5. The communication method in the power conversion system according to claim 1, wherein
the power conversion system is a three-phase system and comprises three power conversion cells,
the first terminal of each of the power conversion cells comprises a positive input terminal and a negative input terminal, respectively,
the positive input terminal of each of the power conversion cells is correspondingly connected to a phase input source, and the negative input terminals of all the power conversion cells are connected commonly, and
the first electrical signal is a voltage at the first terminal of the corresponding power conversion cell.

6. The communication method in the power conversion system according to claim 5, wherein
the first information is K times of the amplitude of the first electrical signal, where K is a positive number, and
the common mode information is a zero-sequence component of the voltage at the first terminal.

7. The communication method in the power conversion system according to claim 6, wherein each of the power conversion cells comprises a power conversion module and a controller that are coupled electrically, each controller comprising a voltage outer-loop control unit and a current inner-loop control unit, and
each current inner-loop control unit generates a voltage reference value at the first terminal of the corresponding power conversion cell according to the current at the first terminal, a current reference value at the first terminal, and the AC harmonic of the corresponding power conversion cell, and each voltage outer-loop control unit generates the current reference value at the first terminal of the corresponding power conversion cell according to the voltage reference value at the first terminal of the corresponding power conversion cell, so that each of the power conversion cells applies a double loop control.

8. The communication method in the power conversion system according to claim 7, wherein each current inner-loop control unit comprises the resonance control unit and a first arithmetic unit, each resonance control unit comprising a first proportional controller and a third-order resonance controller, and each first arithmetic unit comprising a first arithmetic element and a second arithmetic element, wherein
the first proportional controller performs a proportional operation on the current at the first terminal and the current reference value at the first terminal of the corresponding power conversion cell, and outputs a first output signal correspondingly;
the third-order resonance controller performs a harmonic control on the current at the first terminal and the current reference value at the first terminal of the corresponding power conversion cell, and outputs a third-order harmonic signal correspondingly; and the first arithmetic element generates the common mode information of the corresponding power conversion cell according to the third-order harmonic signal and the injected AC harmonic of the corresponding power conversion cell, and the second arithmetic element generates the voltage reference value at the first terminal of the corresponding power conversion cell according to the first output signal and the common mode information of the corresponding power conversion cell.

9. The communication method in the power conversion system according to claim 1, wherein
each of the first information represents a variable value or an integral value of a current, a voltage, a power or a temperature of the corresponding power conversion cell, and
the common mode information is a mean value of all the first information.

10. The communication method in the power conversion system according to claim 9, wherein each of the power conversion cells comprises a power conversion module and a controller that are coupled electrically, each controller comprising a voltage outer-loop control unit and a current inner-loop control unit, and
each current inner-loop control unit generates a voltage reference value at the first terminal of the corresponding power conversion cell according to the current at the first terminal, a current reference value at the first terminal, and the injected AC harmonic of the corresponding power conversion cell, and each voltage outer-loop control unit generates the current reference value at the first terminal of the corresponding power conversion cell according to the voltage reference value at the first terminal of the corresponding power conversion cell, so that each of the power conversion cells applies a double loop control.

11. The communication method in the power conversion system according to claim 10, wherein
each current inner-loop control unit comprises the resonance control unit and a first arithmetic unit, each resonance control unit comprising a first proportional controller and an Mth-order resonance controller, where M is a positive integer greater than 1,
wherein,
the first proportional controller performs a proportional operation on the current at the first terminal and the current reference value at the first terminal of the corresponding power conversion cell, and outputs a first output signal correspondingly;
the Mth-order resonance controller performs a harmonic control on the current at the first terminal and the current reference value at the first terminal of the corresponding power conversion cell, and outputs an Mth-order harmonic signal correspondingly, wherein the Mth-order harmonic signal is the second electrical signal comprising the common mode information; and
the first arithmetic unit generates the voltage reference value at the first terminal of the corresponding power conversion cell according to the first output signal, the Mth-order harmonic signal and the injected AC harmonic of the corresponding power conversion cell, and wherein, M is not equal to a multiple of 3 when the power conversion system is a three-phase system.

12. The communication method in the power conversion system according to claim 11, wherein each controller further comprises a mean value extraction unit for extracting the mean value of all the first information in the Mth-order harmonic signal.

13. A power conversion system, comprising:
at least two power conversion cells, first terminals of the at least two power conversion cells being electrically coupled, and each of the power conversion cells comprising a controller, and each controller comprising a resonance control unit,
wherein the controller in each of the power conversion cells is configured to:
generate an AC harmonic according to a first electrical signal at the first terminal of a corresponding power conversion cell, wherein an amplitude of the AC harmonic represents first information of the power conversion cell generating the AC harmonic correspondingly, and all the AC harmonics are at a same frequency; and
inject the AC harmonic generated by the corresponding power conversion cell into the first terminal of the corresponding power conversion cell, and apply, by the resonance control unit in the corresponding power conversion cell, a closed-loop suppression to the AC harmonic generated by the corresponding power conversion cell, and control the resonance control unit to output a second electrical signal related to the first information, wherein the second electrical signal comprises the common mode information of the power conversion cell, or is used to generate the common mode information of the power conversion cell with the injected AC harmonic.

14. The power conversion system according to claim 13, wherein the resonance control unit in the controller in each of the power conversion cells is configured to:
perform a phase-locking operation on the first electrical signal at the first terminal of the corresponding power conversion cell and perform a frequency-doubling operation on result of the phase-locking operation to generate a phase of the AC harmonic; and
set K times the amplitude of the first information of the power conversion cell as the amplitude of the AC harmonic, where K is a positive number.

15. The power conversion system according to claim 13, wherein
the power conversion system is a single-phase system, and
the first terminals of the at least two power conversion cells are connected in series, and the first electrical signal is a current flowing through each of the first terminals.

16. The power conversion system according to claim 13, wherein
the power conversion system is a single-phase system, and
the first terminals of the at least two power conversion cells are connected in parallel, and the first electrical signal is a voltage at each of the first terminals.

17. The power conversion system according to claim 13, wherein
the power conversion system is a three-phase system and comprises three power conversion cells,
the first terminal of each of the power conversion cells comprises a positive input terminal and a negative input terminal, respectively,
the positive input terminal of each of the power conversion cells is correspondingly connected to a phase input source, and the negative input terminals of all the power conversion cells are connected commonly, and the first electrical signal is a voltage at the first terminal of the corresponding power conversion cell.

18. The power conversion system according to claim 17, wherein
the first information is K times of the amplitude of the first electrical signal, where K is a positive number, and
the common mode information is a zero-sequence component of the voltage at the first terminal.

19. The power conversion system according to claim 18, wherein each of the power conversion cells comprises a power conversion module and a controller that are coupled electrically, each controller comprising a voltage outer-loop control unit and a current inner-loop control unit, and
each current inner-loop control unit is configured to generate a voltage reference value at the first terminal of the corresponding power conversion cell according to the current at the first terminal, a current reference value at the first terminal, and the AC harmonic of the corresponding power conversion cell, and each voltage outer-loop control unit is configured to generate the current reference value at the first terminal of the corresponding power conversion cell according to the voltage reference value at the first terminal of the corresponding power conversion cell, so that each of the power conversion cells applies a double loop control.

20. The power conversion system according to claim 19, wherein each current inner-loop control unit comprises the resonance control unit and a first arithmetic unit, each resonance control unit comprising a first proportional controller and a third-order resonance controller, and each first arithmetic unit comprising a first arithmetic element and a second arithmetic element, wherein
the first proportional controller is configured to perform a proportional operation on the current at the first terminal and the current reference value at the first terminal of the corresponding power conversion cell, and outputs a first output signal correspondingly;
the third-order resonance controller is configured to perform a harmonic control on the current at the first terminal and the current reference value at the first terminal of the corresponding power conversion cell, and outputs a third-order harmonic signal correspondingly; and
the first arithmetic element is configured to generate the common mode information of the corresponding power conversion cell according to the third-order harmonic signal and the injected AC harmonic of the corresponding power conversion cell, and the second arithmetic element is configured to generate the voltage reference value at the first terminal of the corresponding power conversion cell according to the first output signal and the common mode information of the corresponding power conversion cell.

21. The power conversion system according to claim 13, wherein
each of the first information represents a variable value or an integral value of a current, a voltage, a power or a temperature of the corresponding power conversion cell, and
the common mode information is a mean value of all the first information.

22. The power conversion system according to claim 21, wherein each of the power conversion cells comprises a power conversion module and a controller that are coupled electrically, each controller comprising a voltage outer-loop control unit and a current inner-loop control unit, and
the current inner-loop control unit is configured to generate a voltage reference value at the first terminal of the corresponding power conversion cell according to the current at the first terminal, a current reference value at the first terminal, and the injected AC harmonic of the corresponding power conversion cell, and the voltage outer-loop control unit is configured to generate the current reference value at the first terminal of the corresponding power conversion cell according to the voltage reference value at the first terminal of the corresponding power conversion cell, so that each of the power conversion cells applies a double loop control.

23. The power conversion system according to claim 22, wherein each current inner-loop control unit comprises the resonance control unit and a first arithmetic unit, each resonance control unit comprising a first proportional controller and an Mth-order resonance controller, where M is a positive integer greater than 1,
wherein,
the first proportional controller is configured to perform a proportional operation on the current at the first terminal and the current reference value at the first terminal of the corresponding power conversion cell, and outputs a first output signal correspondingly;
the Mth-order resonance controller is configured to perform a harmonic control on the current at the first terminal and the current reference value at the first terminal of the corresponding power conversion cell, and outputs an Mth-order harmonic signal correspondingly, wherein the Mth-order harmonic signal is the second electrical signal comprising the common mode information; and
the first arithmetic unit is configured to generate the voltage reference value at the first terminal of the corresponding power conversion cell according to the first output signal, the Mth-order harmonic signal and the injected AC harmonic of the corresponding power conversion cell, and
wherein, M is not equal to a multiple of 3 when the power conversion system is a three-phase system.

24. The communication method in the power conversion system according to claim 23, wherein each controller further comprises a mean value extraction unit for extracting the mean value of all the first information in the Mth-order harmonic signal.

* * * * *